(12) United States Patent
Sakai

(10) Patent No.: US 11,283,367 B2
(45) Date of Patent: Mar. 22, 2022

(54) POWER CONVERSION APPARATUS AND CONTROL METHOD OF THE SAME

(71) Applicant: FANUC CORPORATION, Yamanashi (JP)

(72) Inventor: Koujirou Sakai, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/932,875

(22) Filed: Jul. 20, 2020

(65) Prior Publication Data

US 2021/0028720 A1 Jan. 28, 2021

(30) Foreign Application Priority Data

Jul. 24, 2019 (JP) .............................. JP2019-135773

(51) Int. Cl.
| | |
|---|---|
| *H02M 1/32* | (2007.01) |
| *H02M 1/26* | (2006.01) |
| *H02H 7/12* | (2006.01) |
| *H02M 7/219* | (2006.01) |
| *H02M 1/44* | (2007.01) |
| *H02H 7/125* | (2006.01) |
| *H02M 1/12* | (2006.01) |

(52) U.S. Cl.
CPC ............. *H02M 7/219* (2013.01); *H02M 1/44* (2013.01); *H02H 7/125* (2013.01); *H02M 1/126* (2013.01); *H02M 1/322* (2021.05)

(58) Field of Classification Search
CPC ........ H02H 7/125–1257; H02M 1/322; H02M 1/126; H02M 7/12; H02M 7/219
See application file for complete search history.

(56) References Cited

U.S. PATENT DOCUMENTS

| 5,491,624 | A | * | 2/1996 | Levran | ................... | H02M 7/219 |
|---|---|---|---|---|---|---|
| | | | | | | 363/44 |
| 9,667,128 | B2 | * | 5/2017 | Patel | ..................... | H02M 1/126 |
| 11,101,728 | B2 | * | 8/2021 | Toyodome | ............ | H02M 1/143 |
| 2013/0286692 | A1 | * | 10/2013 | Patel | ..................... | H02M 1/126 |
| | | | | | | 363/37 |
| 2018/0102647 | A1 | * | 4/2018 | Ohnishi | ................... | H02J 3/005 |
| 2019/0068106 | A1 | * | 2/2019 | Kuroki | ................... | H02P 29/024 |
| 2019/0089181 | A1 | * | 3/2019 | Toyoda | ...................... | H02J 9/06 |
| 2020/0044577 | A1 | * | 2/2020 | Shikagawa | .............. | H02P 27/06 |
| 2020/0280265 | A1 | * | 9/2020 | Nishimura | ............ | H02M 7/487 |
| 2021/0021205 | A1 | * | 1/2021 | Horikoshi | ........... | H02M 7/1557 |
| 2021/0036632 | A1 | * | 2/2021 | Hayashi | .............. | H02M 5/4585 |
| 2021/0075336 | A1 | * | 3/2021 | Kuroki | ................ | H02M 5/4585 |
| 2021/0175742 | A1 | * | 6/2021 | Hayashi | .............. | H02M 7/4833 |

FOREIGN PATENT DOCUMENTS

JP 2016-027774 A 2/2016

* cited by examiner

*Primary Examiner* — Sisay G Tiku
(74) *Attorney, Agent, or Firm* — Robert P. Michal, Esq.; Carter, DeLuca & Farrell LLP

(57) ABSTRACT

A power conversion apparatus includes: a converter including switching elements and configured to convert an AC voltage supplied from an AC power supply through a switch unit into a DC voltage; a filter provided between the switch unit and the converter and including reactors and capacitors, the filter being configured to remove noise; and a control unit configured to discharge electric charge stored in the capacitors by setting the switching elements into an ON state after opening the switch unit.

8 Claims, 18 Drawing Sheets

POWER CONVERSION APPARATUS AND CONTROL METHOD OF THE SAME

CROSS-REFERENCE TO RELATED APPLICATION

This application is based upon and claims the benefit of priority from Japanese Patent Application No. 2019-135773 filed on Jul. 24, 2019, the contents of which are incorporated herein by reference.

BACKGROUND OF THE INVENTION

Field of the Invention

The present invention relates to a power conversion apparatus and a control method thereof.

Description of the Related Art

Japanese Laid-Open Patent Publication No. 2016-027774 discloses a power conversion apparatus that stops switching of a converter when the input voltage or input current to the converter is equal to or greater than a set value. According to Japanese Laid-Open Patent Publication No. 2016-027774, it is possible to contribute to prevention against breakage of electric components.

SUMMARY OF THE INVENTION

However, the technology described in Japanese Laid-Open Patent Publication No. 2016-027774 is not always effective in preventing damage to the switching elements and the like provided in the converter.

It is therefore an object of the present invention to provide a power conversion apparatus and a control method thereof that can favorably prevent switching elements and others from being broken.

According to one aspect of the present invention, a power conversion apparatus includes: a converter including switching elements and configured to convert an AC (alternate-current) voltage supplied from an AC power supply through a switch unit into a DC (direct-current) voltage; a filter provided between the switch unit and the converter and including reactors and capacitors, the filter being configured to remove noise; and a control unit configured to discharge electric charge stored in the capacitors by setting the switching elements into an ON state after opening the switch unit.

According to another aspect of the present invention, a control method of a power conversion apparatus including: a converter including switching elements and configured to convert an AC voltage supplied from an AC power supply through a switch unit into a DC voltage; a filter provided between the switch unit and the converter and including reactors and capacitors, the filter being configured to remove noise; and a control unit configured to control the switch unit and the switching elements, includes: a step of opening the switch unit; and a step of discharging electric charge stored in the capacitors by setting the switching elements into an ON state.

According to the present invention, it is possible to provide a power conversion apparatus and its control method that can favorably prevent breakage of the switching elements and the like.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Power conversion apparatus and control methods thereof according to the present invention will be detailed below by describing preferred embodiments with reference to the accompanying drawings.

First Embodiment

Figure 1:
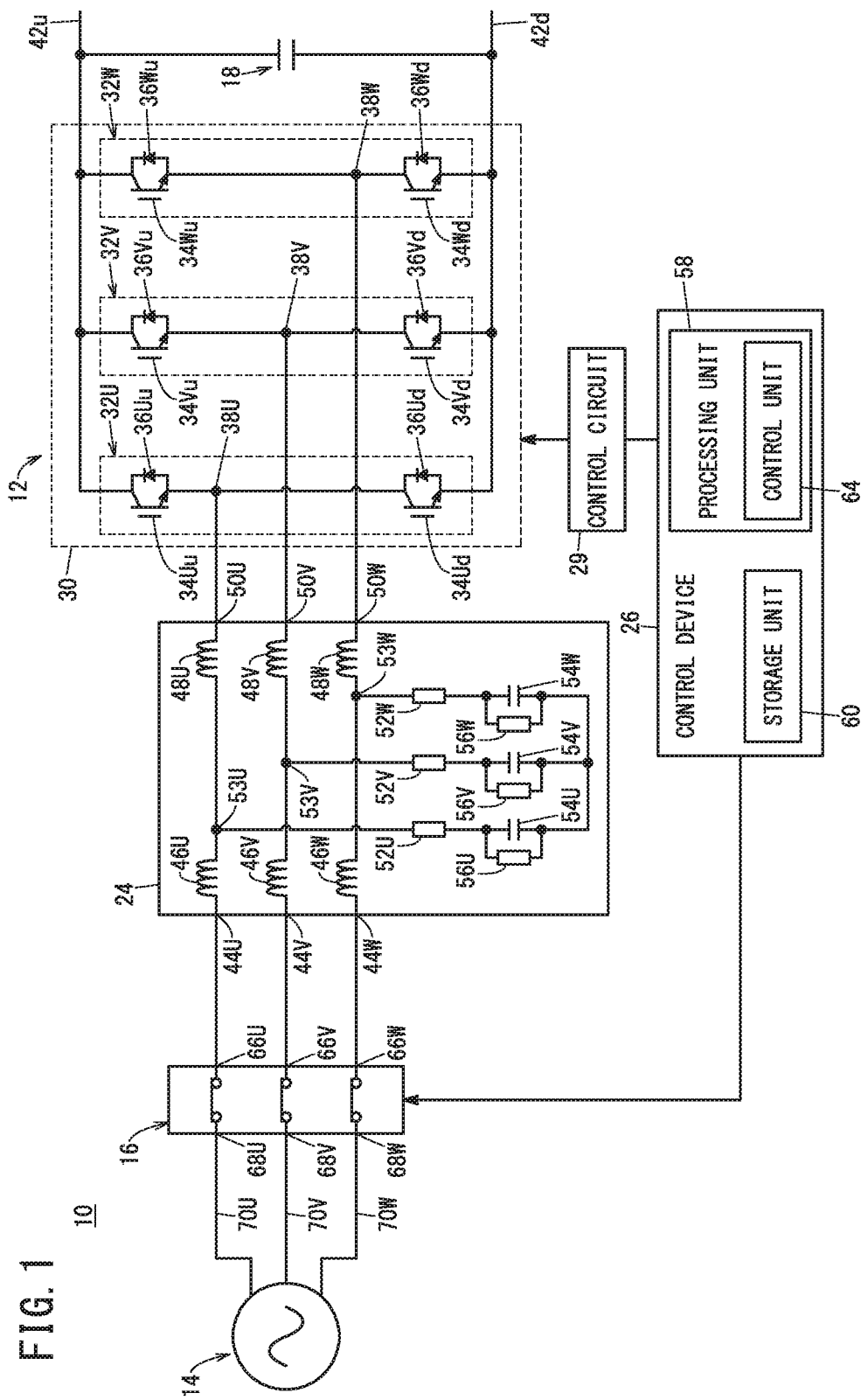
FIG. 1 is a diagram showing a configuration of a power conversion apparatus according to a first embodiment.

A power conversion apparatus and a control method thereof according to a first embodiment will be described with reference to FIGS. 1 to 7. FIG. 1 is a diagram showing a configuration of the power conversion apparatus according to the embodiment.

As shown in FIG. 1, a power conversion apparatus 10 according to the present embodiment includes a converter 12. The converter 12 converts AC (alternate-current) voltage supplied from an AC power supply 14 via a switch unit 16, into DC (direct-current) voltage. The converter 12 is, for example, a known pulse width modulation (PWM) converter, but is not limited to this.

The AC power supply 14 is, for example, a multiphase AC power supply that supplies multiphase voltage, more specifically, a three-phase AC power supply, but is not limited to this. The AC power supply 14 can supply, for example, U-phase, V-phase, and W-phase voltages that are out of phase by 120 degrees.

The switch unit 16 is configured to turn on and off the supply of AC voltage from the AC power supply 14 to the power conversion apparatus 10. As the switch unit 16, for example, a magnetic contactor, a breaker or the like may be used, but the switch unit 16 is not limited to this.

The power conversion apparatus 10 further includes a filter 24. The filter 24 is disposed between the switch unit 16 and the converter 12. The filter 24 can remove noise transmitted from the converter 12 side to the AC power supply 14 side, and can also remove noise transmitted from the AC power supply 14 side to the converter 12 side.

The converter 12 includes a rectifier circuit 30. The rectifier circuit 30 rectifies the AC voltage supplied from the AC power supply 14 via the switch unit 16, into a DC voltage.

The rectifier circuit 30 is provided with power device units 32U, 32V, 32W corresponding to different phases in the AC power supply 14.

The power device unit 32U corresponding to the U phase includes an upper arm side diode 36Uu, a lower arm side diode 36Ud, an upper arm side switching element (semiconductor switching element) 34Uu, a lower arm side switching element 34Ud.

The power device unit 32V corresponding to the V phase includes an upper arm side diode 36Vu, a lower arm side diode 36Vd, an upper arm side switching element 34Vu, and a lower arm side switching element 34Vd.

The power device unit 32W corresponding to the W phase includes an upper arm side diode 36Wu, a lower arm side diode 36Wd, an upper arm side switching element 34Wu, and a lower arm side switching element 34Wd.

Reference numeral 36 is used to describe the diodes in general, and reference numerals 36Uu, 36Ud, 36Vu, 36Vd, 36Wu, 36Wd are used to describe individual diodes. Reference numeral 36*u* is used to describe the upper arm side diodes in general, and reference numerals 36Uu, 36Vu, 36Wu are used to describe individual upper arm side diodes. Reference numeral 36*d* is used to describe the lower arm side diodes in general, and reference numerals 36Ud, 36Vd, and 36Wd are used to describe individual lower arm side diodes.

Reference numeral 34 is used to describe switching elements in general, and reference numerals 34Uu, 34Ud, 34Vu, 34Vd, 34Wu, and 34Wd are used to describe individual switching elements. Further, the reference numeral 34*u* is used to describe the upper arm side switching elements in general, and the reference numerals 34Uu, 34Vu, and 34Wu are used to describe individual upper arm side switching elements. Reference numeral 34*d* is used to describe the lower arm side switching elements in general, and the reference numerals 34Ud, 34Vd, and 34Wd are used to describe individual lower arm side switching elements. The switching element 34 may be, for example, an insulated gate bipolar transistor (IGBT), but is not limited to this. An FET (Field Effect Transistor) may be used as the switching element 34.

The upper arm side diode 36*u* and the lower arm side diode 36*d* are connected in series with each other. The cathode of the upper arm side diode 36*u* is connected to a first output line 42*u* (one output line). The anode of the upper arm side diode 36*u* is connected to the cathode of the lower arm side diode 36*d*. The anode of the lower arm side diode 36*d* is connected to a second output line (the other output line) 42*d*.

The upper arm side switching element 34*u* and the lower arm side switching element 34*d* are connected in series with each other. The first terminal of the upper arm side switching element 34*u* is connected to the cathode of the upper arm side diode 36*u*. When the switching element 34 is, for example, an IGBT, the first terminal is the collector, and when the switching element 34 is, for example, an FET, the first terminal is one of the source and the drain. The second terminal of the upper arm side switching element 34*u* is connected to the anode of the upper arm side diode 36*u*. When the switching element 34 is, for example, an IGBT, the second terminal is the emitter, and when the switching element 34 is, for example, an FET, the second terminal is the other of the source and drain. The first terminal of the lower arm side switching element 34*d* is connected to the cathode of the lower arm side diode 36*d*. The second terminal of the lower arm side switching element 34*d* is connected to the anode of the lower arm side diode 36*d*.

The anode of the upper arm side diode 36Uu, the second terminal of the upper arm side switching element 34Uu, the cathode of the lower arm side diode 36Ud, and the first terminal of the lower arm side switching element 34Ud are connected to a node 38U, and the node 38U is supplied with a voltage for the U-phase.

The anode of the upper arm side diode 36Vu, the second terminal of the upper arm side switching element 34Vu, the cathode of the lower arm side diode 36Vd, and the first terminal of the lower arm side switching element 34Vd are connected to a node 38V, and the node 38V is supplied with a voltage for the V-phase.

The anode of the upper arm side diode 36Wu, the second terminal of the upper arm side switching element 34Wu, the cathode of the lower arm side diode 36Wd, and the first terminal of the lower arm side switching element 34Wd are connected to a node 38W, and the node 38W is supplied with a voltage for the W-phase.

The power conversion apparatus 10 further includes a smoothing capacitor 18. The smoothing capacitor 18 is disposed downstream of the converter 12. A first end (one end) of the smoothing capacitor 18 is connected to the first output line 42*u*. A second end (the other end) of the smoothing capacitor 18 is connected to the second output line 42*d*. The smoothing capacitor 18 smooths the DC voltage output from the converter 12, that is, the DC voltage rectified by the rectifier circuit 30.

The filter 24 includes reactors 46U, 46V, and 46W. First ends of the reactors 46U, 46V, 46W are connected to first input/output terminals 44U, 44V, 44W of the filter 24, respectively. AC voltage is supplied from the AC power supply 14 to the first input/output terminals 44U, 44V, 44W of the filter 24 through the switch unit 16.

The filter 24 further includes reactors 48U, 48V, 48W. The second ends of the reactors 46U, 46V, 46W are connected to first ends of the reactors 48U, 48V, 48W, respectively. The second ends of the reactors 48U, 48V, 48W are connected to second input/output terminals 50U, 50V, 50W of the filter 24, respectively. Nodes 38U, 38V, 38W are connected to the second input/output terminals 50U, 50V, 50W of the filter 24, respectively.

The filter 24 further includes resistors 52U, 52V, 52W. The resistors 52U, 52V, 52W are damping resistors, which are to suppress resonance phenomena. Nodes 53U, 53V, 53W that respectively connected to the second ends of reactors 46U, 46V, 46W and the first ends of reactors 48U, 48V, 48W, are connected to first ends of the resistors 52U, 52V, 52W, respectively.

The filter 24 further includes capacitors 54U, 54V, 54W. Reference numeral 54 is used to describe capacitors in general, and reference numerals 54U, 54V and 54W are used to describe individual capacitors. First ends of the capacitors 54U, 54V, 54W are connected to second ends of the resistors 52U, 52V, 52W, respectively.

The filter 24 further includes resistors 56U, 56V, 56W. The resistors 56U, 56V, 56W are connected in parallel to the capacitors 54U, 54V, 54W, respectively. The resistors 56U, 56V, 56W are configured to discharge electric charges stored in the capacitors 54U, 54V, 54W.

The second ends of the capacitors 54U, 54V, 54W are connected to each other.

First input/output terminals 44U, 44V, 44W of the filter 24 are connected to first input/output terminals 66U, 66V, 66W of the switch unit 16, respectively. The second input/output terminals 68U, 68V, 68W of the switch unit 16 are connected to the AC power supply 14 via a U-phase power supply line (distribution line) 70U, a V-phase power supply line 70V, and a W-phase power supply line 70W, respectively. Reference numeral 70 is used to describe power supply lines in general, and reference numerals 70U, 70V, and 70W are used to describe individual power supply lines.

The power conversion apparatus 10 further includes a control circuit 29. The control circuit 29 is configured to control the converter 12. Specifically, the control circuit 29, based on the signal (command) supplied from the control unit 64, applies a voltage to the third terminal (gate) of each switching element 34, to thereby perform switching of the switching element 34 appropriately. The control circuit 29 can adjust the output voltage, that is, adjust the voltage across the smoothing capacitor 18 and the like by appropriately switching the switching elements 34.

The power conversion apparatus 10 further includes a control device 26. The control device 26 controls the entire power conversion apparatus 10. The control device 26 includes a processing unit 58 and a storage unit 60. The processing unit 58 may be configured of, for example, a CPU (Central Processing Unit) and the like, but is not limited to this. The storage unit 60 includes, for example, an unillustrated volatile memory and an unillustrated non-volatile memory. Examples of the volatile memory include RAM (Random Access Memory) and the like. Examples of the non-volatile memory include ROM (Read Only Memory) and flash memory. Programs, data, tables, and the like may be stored in the storage unit 60.

The processing unit 58 includes a control unit 64. The control unit 64 may be realized by a program stored in the storage unit 60 being executed by the processing unit 58.

The control unit 64 can control opening and closing (switching operation) of the switch unit 16. When the switch unit 16 is closed, the AC voltage from the AC power supply 14 is supplied to the converter 12 via the switch unit 16 and the filter 24. When the switch unit 16 is opened, the AC voltage is not supplied to the filter 24 and the converter 12.

The control unit 64 can generate a signal (command) to be supplied to the control circuit 29 based on, for example, information acquired by a voltage sensor, a current sensor, or the like (not shown). The control unit 64 can adjust the output voltage, that is, the voltage across the smoothing capacitor 18 by appropriately switching the switching elements 34 using the control circuit 29. Further, as will be described later, the control unit 64 can discharge the electric charge stored in the capacitor 54 provided in the filter 24 by appropriately switching the switching elements 34 using the control circuit 29.

A voltage corresponding to the three-phase AC line voltage is applied between both ends of the capacitor 54. Electric charge corresponding to the applied voltage is stored (charged) in the capacitor 54. When the switch unit 16 is transitioned (changed) from a closed state to an open state, the electric charge stored in the capacitor 54 starts to be discharged via the resistor 56 at that point of time. When only a relatively short period has passed after the transition of the switch unit 16 from the closed state to the open state, the electric charge stored in the capacitor 54 has not been sufficiently discharged, so that the voltage across the capacitor 54 remains large. Transition (i.e., changing) of the switch unit 16 from the open state to the closed state may cause a resonance voltage in the filter 24. When the switch unit 16 that has been changed to the open state is returned again to the closed state in a relatively short period and when the phase of the line voltage at the time of changing the switch unit 16 to the open state is opposite to the phase of the line voltage at the time of returning the switch unit 16 to the closed state, the peak of resonance voltage can become significantly large. When a resonance voltage having such a significantly large peak is applied to the switching element 34, there is a risk that the switching element 34 will be broken. To deal with this, in the present embodiment, after the switch unit 16 is opened, the switching element 34 is set into the ON state. Therefore, in the embodiment, the electric charge stored in the capacitor 54 is promptly discharged. As a result, in the present embodiment, it is possible to prevent the peak of the resonance voltage from significantly increasing, and hence prevent the switching element 34 and the like from being broken.

Figure 2:
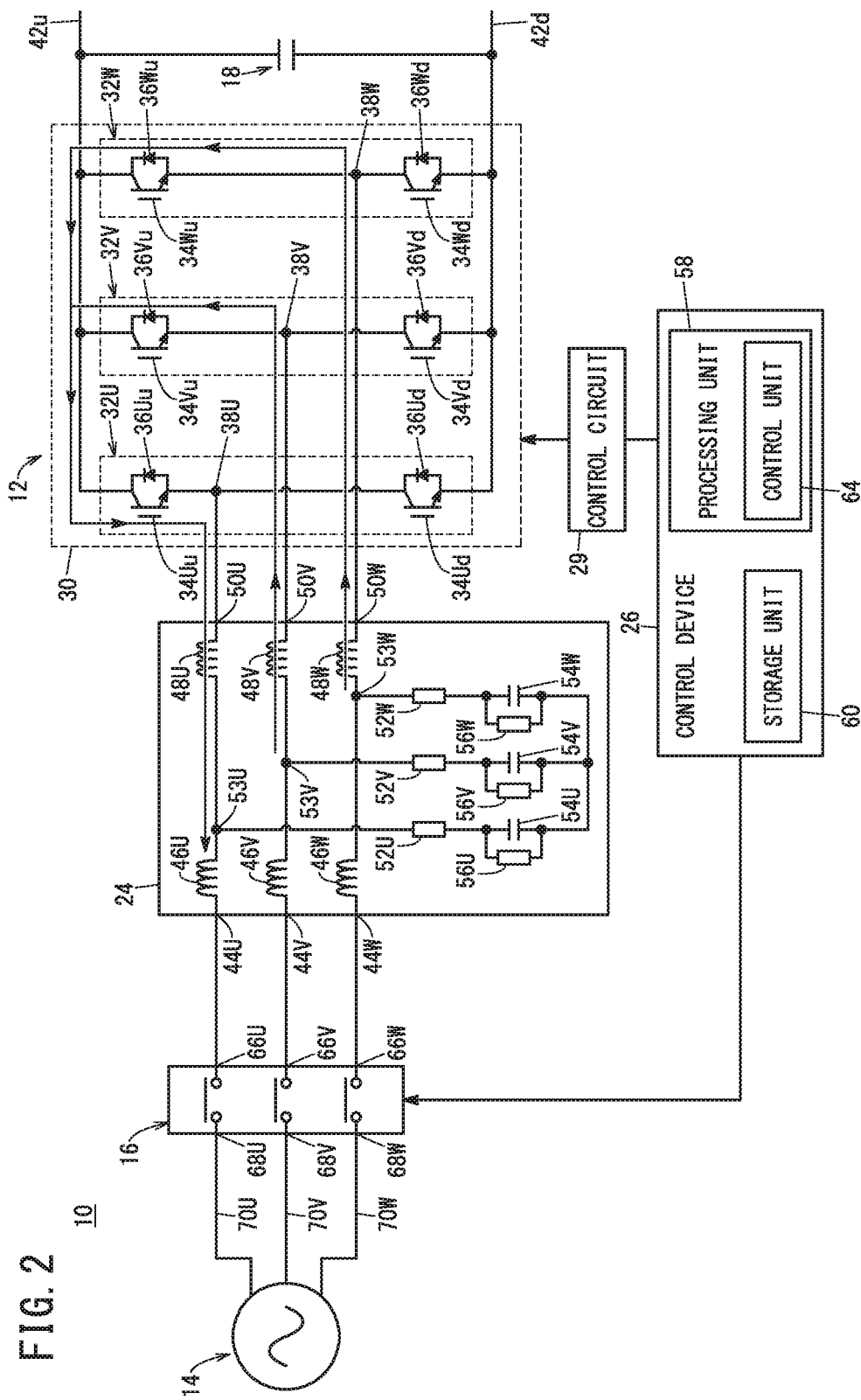
FIG. 2 is a diagram showing an example of discharge paths when all the upper arm side switching elements of multiple power device units are simultaneously set into an ON state.

After placing the switch unit 16 in an open state, the control unit 64 can simultaneously set all the upper arm side switching elements 34u of the multiple power device units 32, into the ON state. FIG. 2 is a diagram showing an example of discharge paths when all the upper arm side switching elements of the multiple power device units are simultaneously set into the ON state. FIG. 2 shows an example in which the switch unit 16 is in the open state and the capacitor 54U corresponding to the U phase has the lowest voltage thereacross among all the capacitors 54. The voltage across the capacitor 54V corresponding to the V phase is higher than the voltage across the capacitor 54U corresponding to the U phase. Further, the voltage across the capacitor 54W corresponding to the W phase is higher than the voltage across the capacitor 54U corresponding to the U phase. Therefore, as shown in FIG. 2, the electric charge stored in the capacitor 54V corresponding to the V phase flows through the diode 36Vu, and the electric charge on the capacitor 54W corresponding to the W phase flows through the diode 36Wu. The charges flowing through the diodes 36Vu and 36Wu flow through the switching element 34Uu corresponding to the U phase, and flow into the capacitor 54U corresponding to the U phase. When all the upper arm side switching elements 34u of the multiple power device units 32 are simultaneously set into the ON state, the electric charges stored in the capacitors 54 are discharged in this manner.

Figure 3:
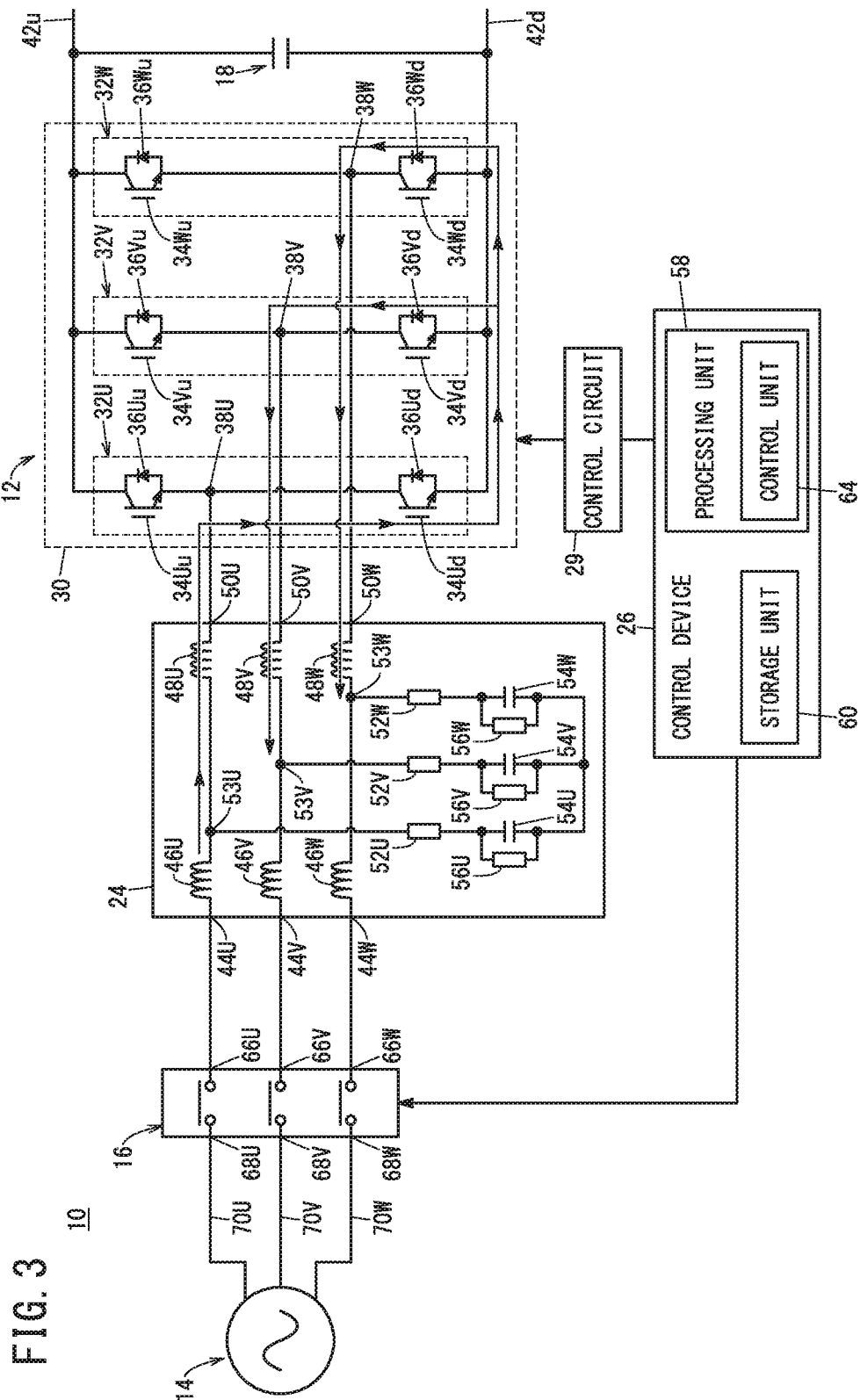
FIG. 3 is a diagram showing an example of discharge paths when all the lower arm side switching elements of multiple power device units are simultaneously set into an ON state.

After placing the switch unit 16 in an open state, the control unit 64 can simultaneously set all the lower arm side switching elements 34d of the multiple power device units 32, into the ON state. FIG. 3 is a diagram showing an example of discharge paths when all the lower arm side switching elements of the multiple power device units are simultaneously set into the ON state. FIG. 3 shows an example in which the switch unit 16 is in the open state and the capacitor 54U corresponding to the U phase has the highest voltage thereacross among all the capacitors 54. The voltage across the capacitor 54V corresponding to the V phase is lower than the voltage across the capacitor 54U corresponding to the U phase. Further, the voltage across the capacitor 54W corresponding to the W phase is lower than the voltage across the capacitor 54U corresponding to the U phase. Therefore, as shown in FIG. 3, the electric charge stored in the capacitor 54U corresponding to the U-phase flows through the switching element 34Ud. The charge flowing through the switching element 34Ud flows through the diode 36Vd corresponding to the V phase and the diode 36Wd corresponding to the W phase, and flows into the capacitor 54V corresponding to the V phase and the capacitor 54W corresponding to the W phase. When all the lower arm side switching elements 34d of the multiple power device units 32 are simultaneously set into the ON state, the electric charges stored in the capacitors 54 are discharged in this manner.

After opening the switch unit 16, the control unit 64 can set one of the upper arm side switching elements 34u of the multiple power device units 32 into the ON state, and then switch the switching elements 34u to the ON state in turn. For example, in a case where the capacitor 54U corresponding to the U phase has the lowest voltage thereacross among all the capacitors 54, when the switching element 34Uu corresponding to the U phase is set into the ON state, electric charges are discharged through the path as shown in FIG. 2. It should be noted that when the capacitor 54U corresponding to the U phase has the lowest voltage thereacross among all the capacitors 54, discharging as shown in FIG. 2 will not occur even if the switching element 34Vu corresponding to the V phase is set into the ON state or even if the switching element 34Wu corresponding to the W phase is set into the ON state.

After opening the switch unit 16, the control unit 64 can set one of the lower arm side switching elements 34d of the multiple power device units 32 into the ON state, and then switch the switching elements 34d to the ON state in turn. For example, in a case where the capacitor 54U corresponding to the U phase has the highest voltage thereacross among all the capacitors 54, when the switching element 34Ud corresponding to the U phase is set into the ON state, electric charges are discharged through the path as shown in FIG. 3. It should be noted that when the capacitor 54U corresponding to the U phase has the highest voltage thereacross among all the capacitors 54, discharging as shown in FIG. 3 will not occur even if the switching element 34Vd corresponding to the V phase is set into the ON state or even if the switching element 34Wd corresponding to the W phase is set into the ON state.

Figure 4:
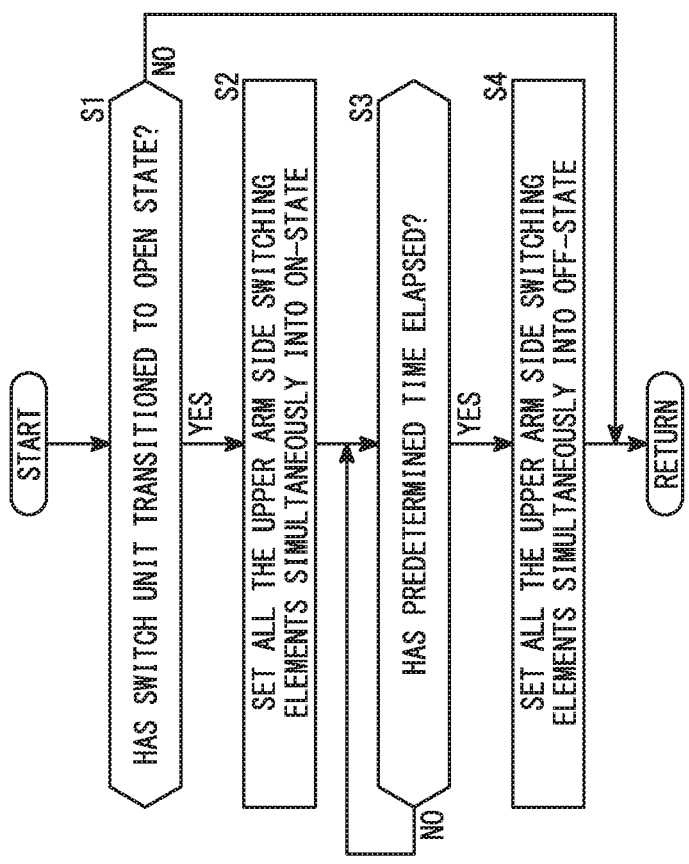
FIG. 4 is a flowchart showing an example of the operation of the power conversion apparatus according to the first embodiment.

Referring to FIG. 4, an example of the operation of the power conversion apparatus 10 according to this embodiment will be described. FIG. 4 is a flowchart showing an example of the operation of the power conversion apparatus according to the present embodiment.

At step S1, the control unit 64 determines whether or not the switch unit 16 has transitioned from the closed state to the open state. When the switch unit 16 has transitioned from the closed state to the open state (YES at step S1), the control proceeds to step S2. When the switch unit 16 has not transitioned from the closed state to the open state (NO at step S1), the control shown in FIG. 4 is ended.

At step S2, the control unit 64 simultaneously set all the upper arm side switching elements 34u of the multiple power device units 32, into the ON state. Then, the control proceeds to step S3.

At step S3, the control unit 64 determines whether or not a predetermined time has elapsed from the time of setting the upper arm side switching elements 34u into the ON state. The predetermined time can be counted by, for example, an unillustrated timer. When the predetermined time has elapsed from the time of setting the upper arm side switching elements 34u into the ON state (YES at step S3), the control proceeds to step S4. When the predetermined time has not elapsed from the time of setting the upper arm side switching elements 34u into the ON state (NO at step S3), step S3 is repeated.

At step S4, the control unit 64 simultaneously sets all the upper arm side switching elements 34u of the multiple power device units 32 into the OFF state. Thus, the control shown in FIG. 4 is completed.

Figure 5:
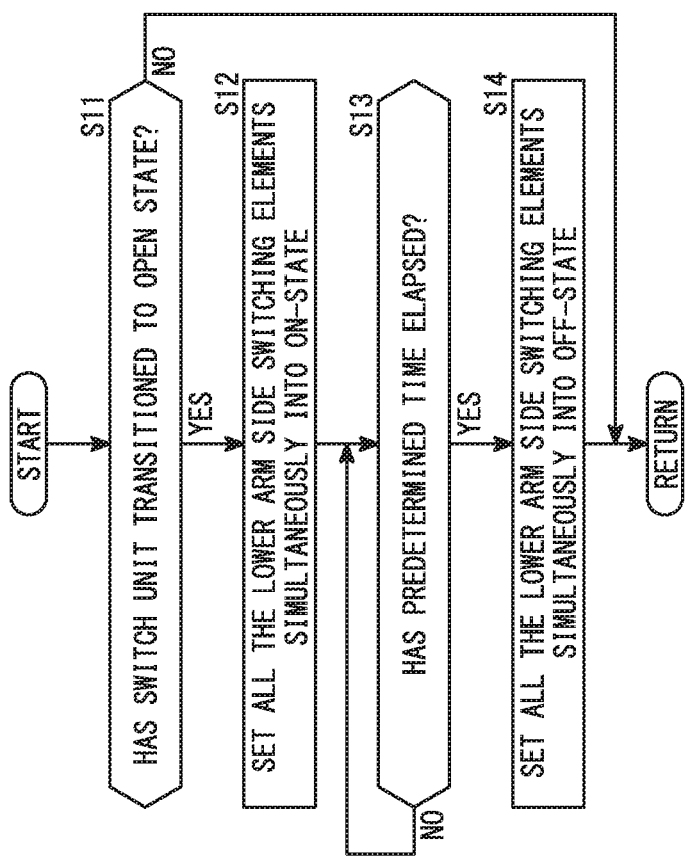
FIG. 5 is a flowchart showing another example of the operation of the power conversion apparatus according to the first embodiment.

Referring to FIG. 5, another example of the operation of the power conversion apparatus 10 according to the embodiment will be described. FIG. 5 is a flowchart showing another example of the operation of the power conversion apparatus according to the present embodiment.

At step S11, the control unit 64 determines whether or not the switch unit 16 has transitioned from the closed state to the open state. When the switch unit 16 has transitioned from the closed state to the open state (YES at step S11), the control proceeds to step S12. When the switch unit 16 has not transitioned from the closed state to the open state (NO at step S11), the control shown in FIG. 5 is ended.

At step S12, the control unit 64 simultaneously set all the lower arm side switching elements 34d of the multiple power device units 32 into the ON state. Then, the control proceeds to step S13.

At step S13, the control unit 64 determines whether or not a predetermined time has elapsed from the time of setting the lower arm side switching elements 34d into the ON state. When the predetermined time has elapsed from the time of setting the lower arm side switching elements 34d into the ON state (YES at step S13), the control proceeds to step S14. When the predetermined time has not elapsed from the time of setting the lower arm side switching elements 34d into the ON state (NO at step S13), step S13 is repeated.

At step S14, the control unit 64 simultaneously sets all the lower arm side switching elements 34d of the multiple power device units 32 into the OFF state. Thus, the control shown in FIG. 5 is completed.

Figure 6:
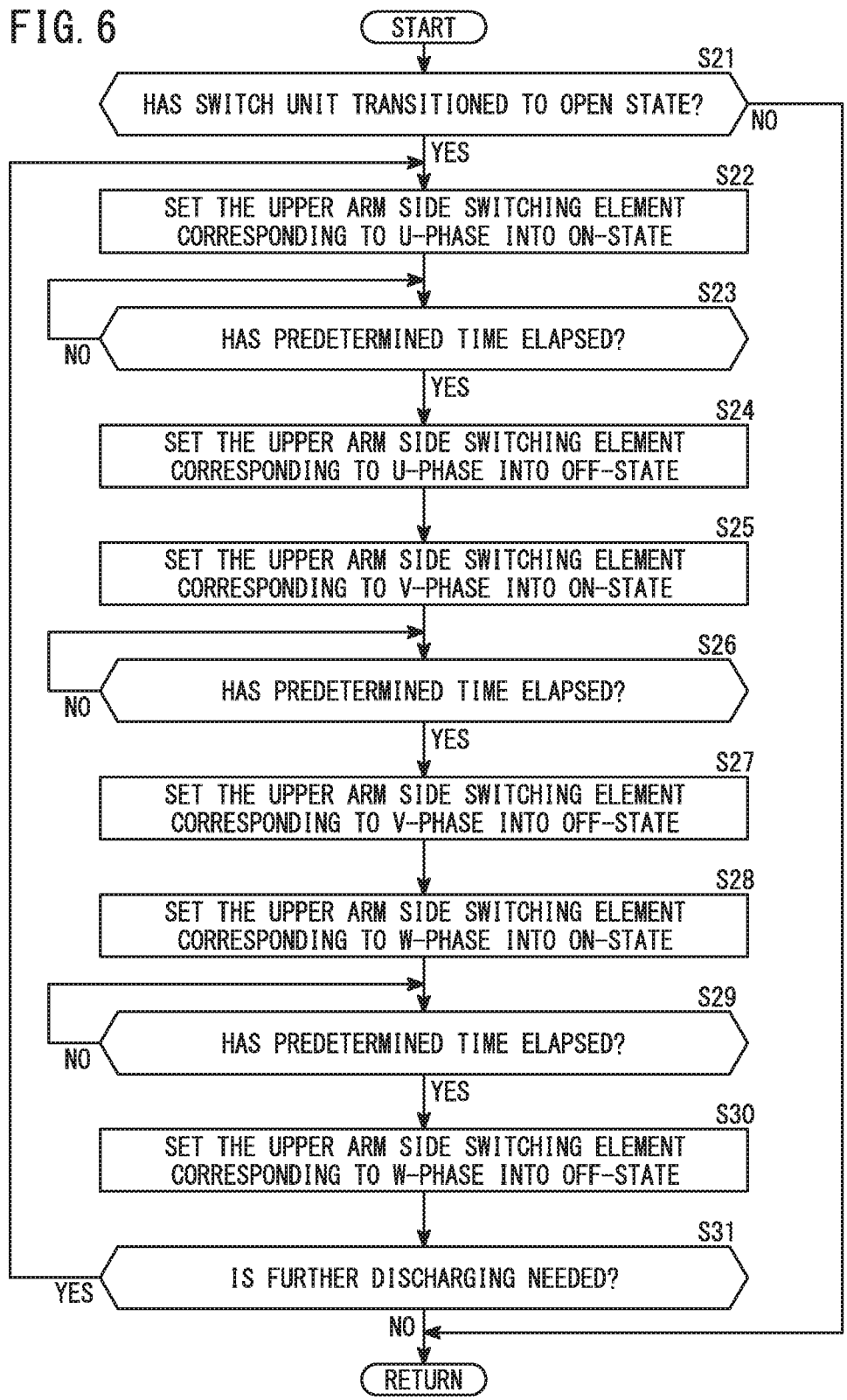
FIG. 6 is a flowchart showing still another example of the operation of the power conversion apparatus according to the first embodiment.

Referring next to FIG. 6, still another example of the operation of the power conversion apparatus 10 according to this embodiment will be described. FIG. 6 is a flowchart showing still another example of the operation of the power conversion apparatus according to this embodiment. FIG. 6 shows an exemplary case where the upper arm side switching element 34Uu corresponding to the U phase is set into the ON state, thereafter the upper arm side switching element 34Vu corresponding to the V phase is set into the ON state, and then the upper arm side switching element 34Wu corresponding to the W phase is set into the ON state. The order in which the upper arm side switching elements 34u are set into the ON state is not limited to this.

At step S21, the control unit 64 determines whether the switch unit 16 has transitioned from the closed state to the open state. When the switch unit 16 has transitioned from the closed state to the open state (YES at step S21), the control proceeds to step S22. When the switch unit 16 has not transitioned from the closed state to the open state (NO at step S21), the control shown in FIG. 6 is ended.

At step S22, the control unit 64 sets the upper arm side switching element 34Uu corresponding to the U phase into the ON state. After that, the control goes to step S23.

At step S23, the control unit 64 determines whether or not a predetermined time has elapsed from the time of setting the upper arm side switching element 34Uu corresponding to the U phase into the ON state. When the predetermined time has elapsed from the time of setting the upper arm side switching element 34Uu corresponding to the U-phase into the ON state (YES at step S23), the control proceeds to step S24. When the predetermined time has not elapsed from the time of setting the upper arm side switching element 34Uu corresponding to the U phase into the ON state (NO at step S23), step S23 is repeated.

At step S24, the control unit 64 sets the upper arm side switching element 34Uu corresponding to the U phase into the OFF state. After that, the control goes to Step S25.

At step S25, the control unit 64 sets the upper arm side switching element 34Vu corresponding to the V phase into the ON state. After that, the control goes to Step S26.

At step S26, the control unit 64 determines whether or not a predetermined time has passed from the time of setting the upper arm side switching element 34Vu corresponding to the V phase into the ON state. When the predetermined time has elapsed from the time of setting the upper arm side switching element 34Vu corresponding to the V phase into the ON state (YES at step S26), the control proceeds to step S27. When the predetermined time has not elapsed from when the upper arm side switching element 34Vu corresponding to the V phase was set into the ON state (NO at step S26), step S26 is repeated.

At step S27, the control unit 64 sets the upper arm side switching element 34Vu corresponding to the V phase into the OFF state. After that, the control goes to Step S28.

At step S28, the control unit 64 sets the upper arm side switching element 34Wu corresponding to the W phase into the ON state. After that, the control goes to Step S29.

At step S29, the control unit 64 determines whether or not a predetermined time has elapsed from when the upper arm side switching element 34Wu corresponding to the W phase was set into the ON state. When the predetermined time has elapsed from when the upper arm side switching element 34Wu corresponding to the W phase was set into the ON state (YES at step S29), the control proceeds to step S30. When the predetermined time has not elapsed from when the upper arm side switching element 34Wu corresponding to the W phase was set into the ON state (NO at step S29), step S29 is repeated.

At step S30, the control unit 64 sets the upper arm side switching element 34Wu corresponding to the W phase into the OFF state. After that, the control goes to Step S31.

At step S31, the control unit 64 determines whether or not further discharging is needed, that is, whether or not further execution of steps S22 to S30 is needed. For example, when the above-described predetermined time is not sufficiently long, it is necessary to perform discharging the electric charge stored in the capacitor 54 multiple times, in order to sufficiently discharge the electric charge. If further discharging is needed (YES at step S31), the control of step S22 and thereafter is executed again. If no further discharging is needed (NO at step S31), the control shown in FIG. 6 is completed.

Figure 7:
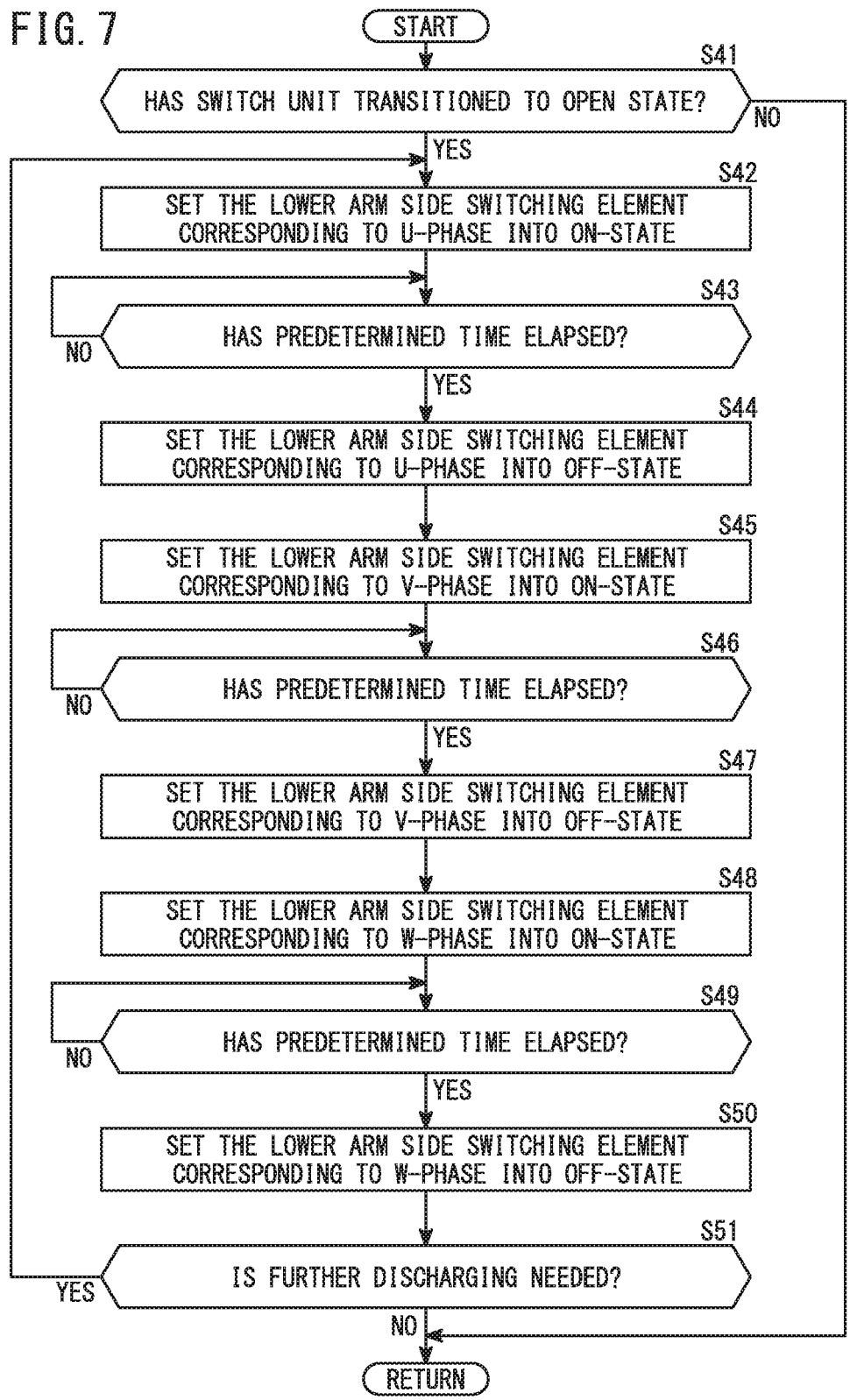
FIG. 7 is a flowchart showing still another example of the operation of the power conversion apparatus according to the first embodiment.

Still another example of the operation of the power conversion apparatus 10 according to the embodiment will be described with reference to FIG. 7. FIG. 7 is a flowchart showing still another example of the operation of the power conversion apparatus according to the present embodiment. FIG. 7 shows an exemplary case where the lower arm side switching element 34Ud corresponding to the U phase is set into the ON state, thereafter the lower arm side switching element 34Vd corresponding to the V phase is set into the ON state, and then the lower arm side switching element 34Wd corresponding to the W phase is set into the ON state. The order in which the lower arm side switching elements 34d are set into the ON state is not limited to this.

At step S41, the control unit 64 determines whether the switch unit 16 has transitioned from the closed state to the open state. When the switch unit 16 has transitioned from the closed state to the open state (YES at step S41), the control proceeds to step S42. When the switch unit 16 has not transitioned from the closed state to the open state (NO at step S41), the control shown in FIG. 7 is ended.

At step S42, the control unit 64 sets the lower arm side switching element 34Ud corresponding to the U phase into the ON state. After that, the control goes to Step S43.

At step S43, the control unit 64 determines whether or not a predetermined time has elapsed from when the lower arm side switching element 34Ud corresponding to the U phase was set into the ON state. When the predetermined time has elapsed from when the lower arm side switching element 34Ud corresponding to the U phase was set into the ON state (YES at step S43), the control proceeds to step S44. When the predetermined time has not elapsed from when the lower arm side switching element 34Ud corresponding to the U-phase was set into the ON state (NO at step S43), step S43 is repeated.

At step S44, the control unit 64 sets the lower arm side switching element 34Ud corresponding to the U phase into the OFF state. After that, the control goes to Step S45.

At step S45, the control unit 64 sets the lower arm side switching element 34Vd corresponding to the V phase into the ON state. After that, the control goes to Step S46.

At step S46, the control unit 64 determines whether or not a predetermined time has elapsed from when the lower arm side switching element 34Vd corresponding to the V phase was set into the ON state. When the predetermined time has elapsed from when the lower arm side switching element 34Vd corresponding to the V phase was set into the ON state (YES at step S46), the control proceeds to step S47. When the predetermined time has not elapsed from when the lower arm side switching element 34Vd corresponding to the V phase was set into the ON state (NO at step S46), step S46 is repeated.

At step S47, the control unit 64 sets the lower arm side switching element 34Vd corresponding to the V phase into the OFF state. After that, the control goes to Step S48.

At step S48, the control unit 64 sets the lower arm side switching element 34Wd corresponding to the W phase into the ON state. After that, the control goes to Step S49.

At step S49, the control unit 64 determines whether or not a predetermined time has elapsed from when the lower arm side switching element 34Wd corresponding to the W phase was set into the ON state. When the predetermined time has elapsed from when the lower arm side switching element 34Wd corresponding to the W phase was set into the ON state (YES at step S49), the control proceeds to step S50. When the predetermined time has not elapsed from when the lower arm side switching element 34Wd corresponding to the W phase was set into the ON state (NO at step S49), step S49 is repeated.

At step S50, the control unit 64 sets the lower arm side switching element 34Wd corresponding to the W phase into the OFF state. After that, the control goes to Step S51.

At step S51, the control unit 64 determines whether or not further discharging is needed, that is, whether or not further execution of steps S42 to S50 is needed. For example, when the above-described predetermined time is not sufficiently long, it is necessary to perform discharging of the electric charge stored in the capacitor 54 multiple times in order to sufficiently discharge the electric charge. If further discharging is needed (YES at step S51), the control of step S42 and thereafter is executed again. If no further discharge is needed (NO at step S51), the control shown in FIG. 7 is completed.

As described above, according to this embodiment, after the switch unit 16 has been opened, the switching element 34 is set into the ON state, and thus the electric charge stored in the capacitor 54 is quickly discharged through the switching element 34. Therefore, according to the present embodiment, it is possible to prevent the peak of the resonance voltage from significantly increasing, and hence prevent the switching elements 34 and the like from being broken.

Second Embodiment

Figure 8:
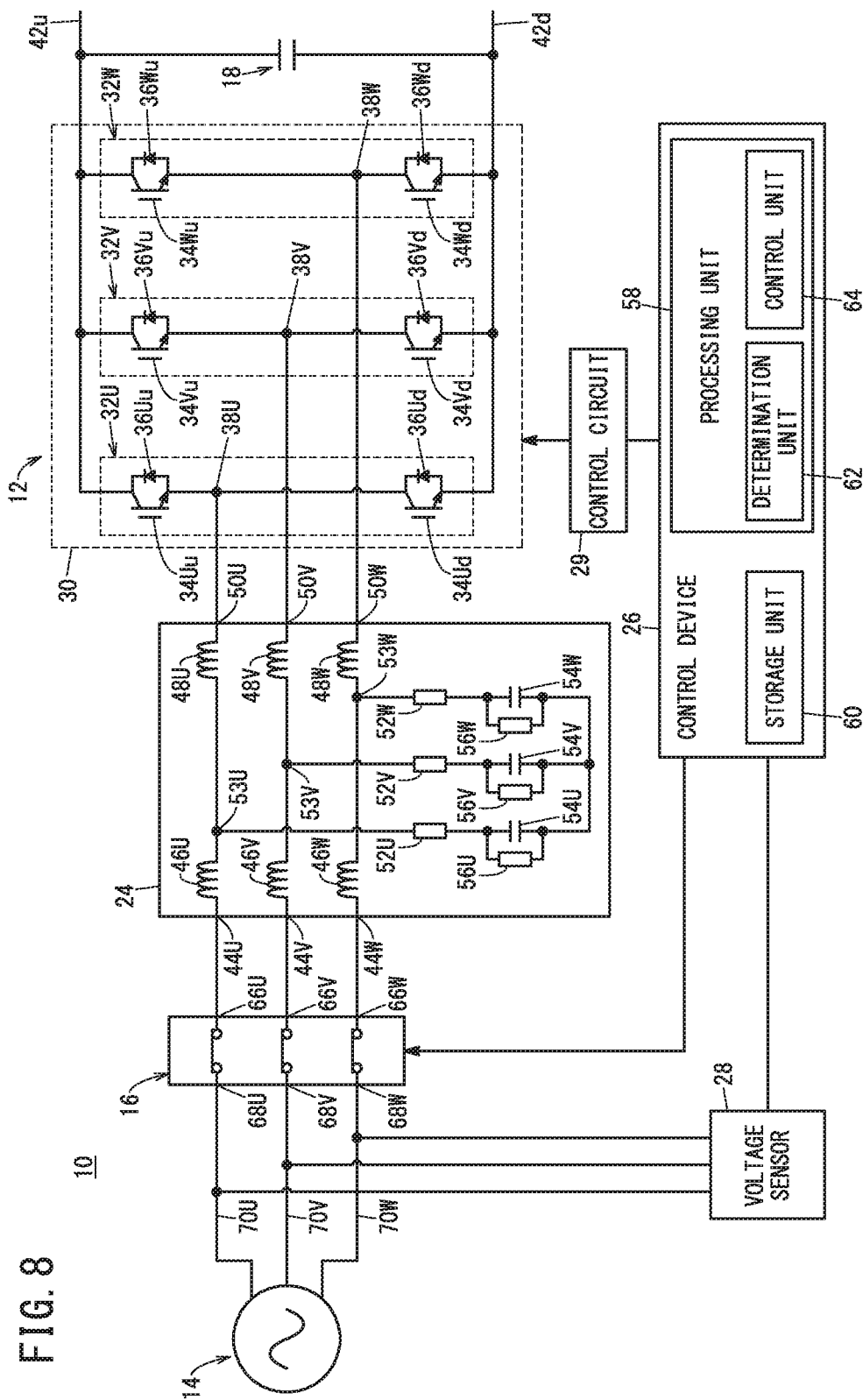
FIG. 8 is a diagram showing a configuration of a power conversion apparatus according to a second embodiment.

A power conversion apparatus and a control method thereof according to a second embodiment will be described with reference to FIGS. 8 to 18. FIG. 8 is a diagram showing a configuration of a power conversion apparatus according to the present embodiment. The same components of the present embodiment as those of the power conversion apparatus and the method for controlling the same according to the first embodiment shown in FIGS. 1 to 7 are given with the same reference numbers, and explanation thereof is not repeated or is simplified.

The power conversion apparatus 10 according to the present embodiment sets, into the ON state, the upper arm side switching element 34u corresponding a phase having the highest phase voltage or the lower arm side switching element 34d corresponding to a phase having the lowest phase voltage.

As shown in FIG. 8, the power conversion apparatus 10 according to the present embodiment further includes a voltage sensor (detection unit) 28. The voltage sensor 28 has multiple input terminals, which are connected to the power supply lines 70U, 70V, 70W, respectively. The voltage sensor 28 can detect the phase voltage in each phase of the AC power supply 14. More specifically, the voltage sensor 28 can acquire the instantaneous value of the phase voltage in each phase of the AC power supply 14, that is, the instantaneous voltage value. The instantaneous voltage value obtained by the voltage sensor 28 is supplied to the control device 26.

The processing unit 58 further includes a determination unit 62. The function of the determination unit 62 can be realized by the processing unit 58 executing a program stored in the storage unit 60.

The determination unit 62 can determine the phase having the highest phase voltage or the lowest phase voltage, based on the information supplied from the voltage sensor 28, that is, the detection result of the voltage sensor 28. Since the phase voltage varies with time, the phase with the highest phase voltage and the phase with the lowest phase voltage varies with time.

The control unit 64 can sequentially set into the ON state the upper arm side switching element 34u corresponding to the phase having the highest phase voltage, or the lower arm side switching element 34d corresponding to the phase having the lowest phase voltage.

In the present embodiment, the upper arm side switching elements 34u corresponding to the phase having the highest phase voltage, or the lower arm side switching elements 34d corresponding to the phase having the lowest phase voltage, are sequentially set into the ON state. The reason is as follows. That is, when the switching element 34 in the ON state is neither the upper arm side switching element 34u corresponding to the phase with the highest phase voltage, nor the lower arm side switching element 34d corresponding to the phase with the lowest phase voltage, the following situation will occur. In this case, if the switch unit 16 accidentally transitions from the open state to the closed state, the power supply line 70 is short-circuited by the switching element 34 that is in the ON state, and a large electric current flows through the switching element 34. Consequently, that switching element 34 is broken. On the other hand, when the switching element 34 in the ON state is either the upper arm side switching element 34u corresponding to the phase with the highest phase voltage, or the lower arm side switching element 34d corresponding to the phase with the lowest phase voltage, the following situation will occur. That is, since the switching element 34 in the ON state is the switching element 34 that is connected in parallel with the conducting diode 36, no particular problem occurs even if an unintended transition from the open state to the closed state takes place in the switch unit 16. This is why, in the present embodiment, the upper arm side switching elements 34u corresponding to the phase having the highest phase voltage or the lower arm side switching elements 34d corresponding to the phase having the lowest phase voltage are sequentially set into the ON state. The unintended transition from the open state to the closed state may occur, for example, when the switch unit 16 is operated by a user or the like.

Figure 9:
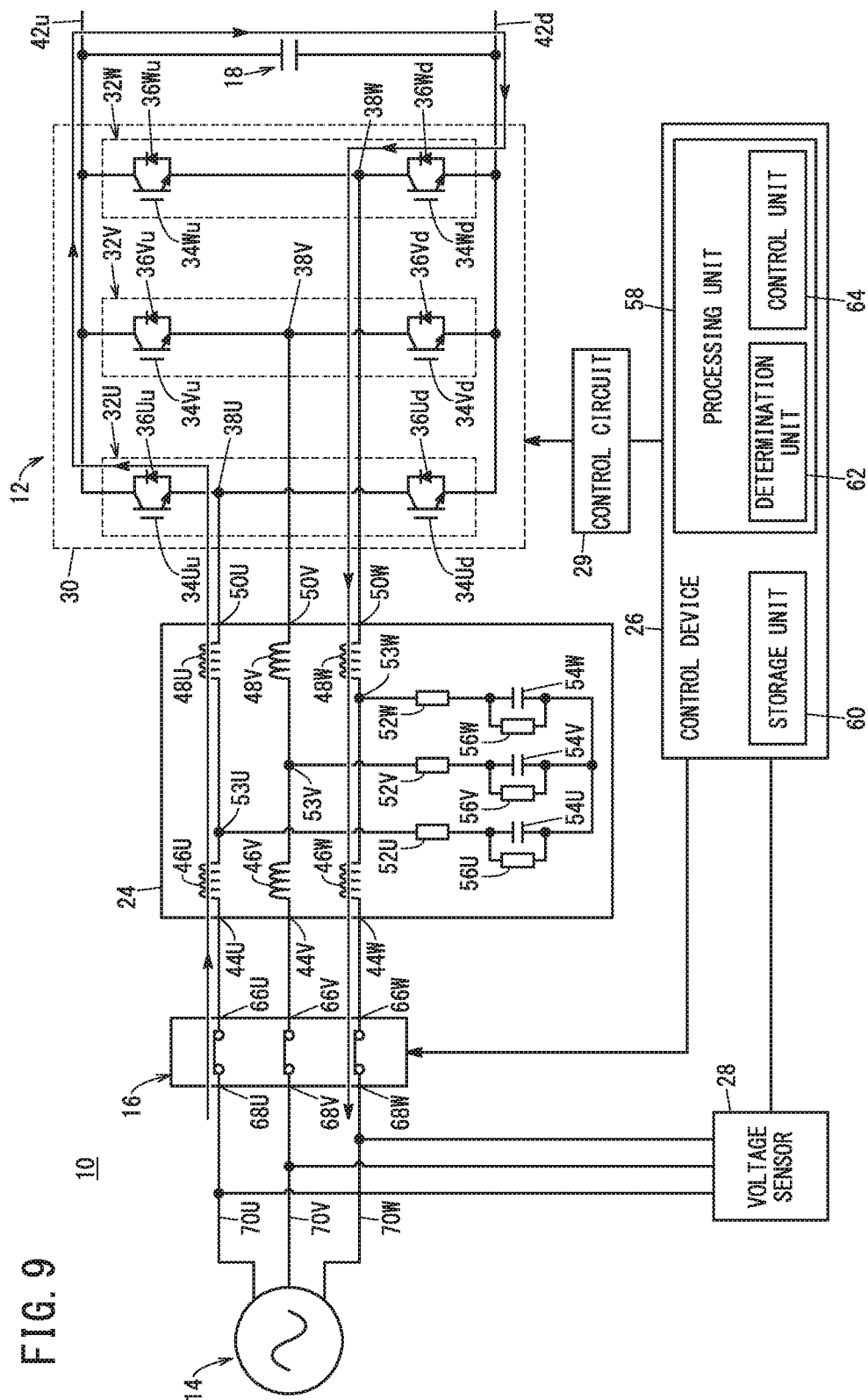
FIG. 9 is a diagram showing an example of current paths when a switch unit is closed.

FIG. 9 is a diagram showing an example of current paths when the switch unit is closed. FIG. 9 shows a case where the U phase has the highest phase voltage and the W phase has the lowest phase voltage. When the U phase has the highest phase voltage and the W phase has the lowest phase voltage, the diode 36Uu and the diode 36Wd are conductive as shown in FIG. 9. In this case, even if the switching element 34Uu connected in parallel with the diode 36Uu is set into the ON state, the switching element 34Uu will not be broken. Further, in this case, even if the switching element 34Wd connected in parallel with the diode 36Wd is set into the ON state, the switching element 34Wd will not be broken. Therefore, when the U phase has the highest phase voltage and the W phase has the lowest phase voltage, even if the switch unit 16 transitions to the closed state while the electric charge stored in the capacitor 54 is being discharged through the switching element 34Uu, the switching element 34Uu will not be broken. Additionally, when the U phase has the highest phase voltage and the W phase has the lowest phase voltage, even if the switch unit 16 transitions to the closed state while the electric charge stored in the capacitor 54 is being discharged through the switching element 34Wd, the switching element 34Wd will not be broken.

Figure 10:
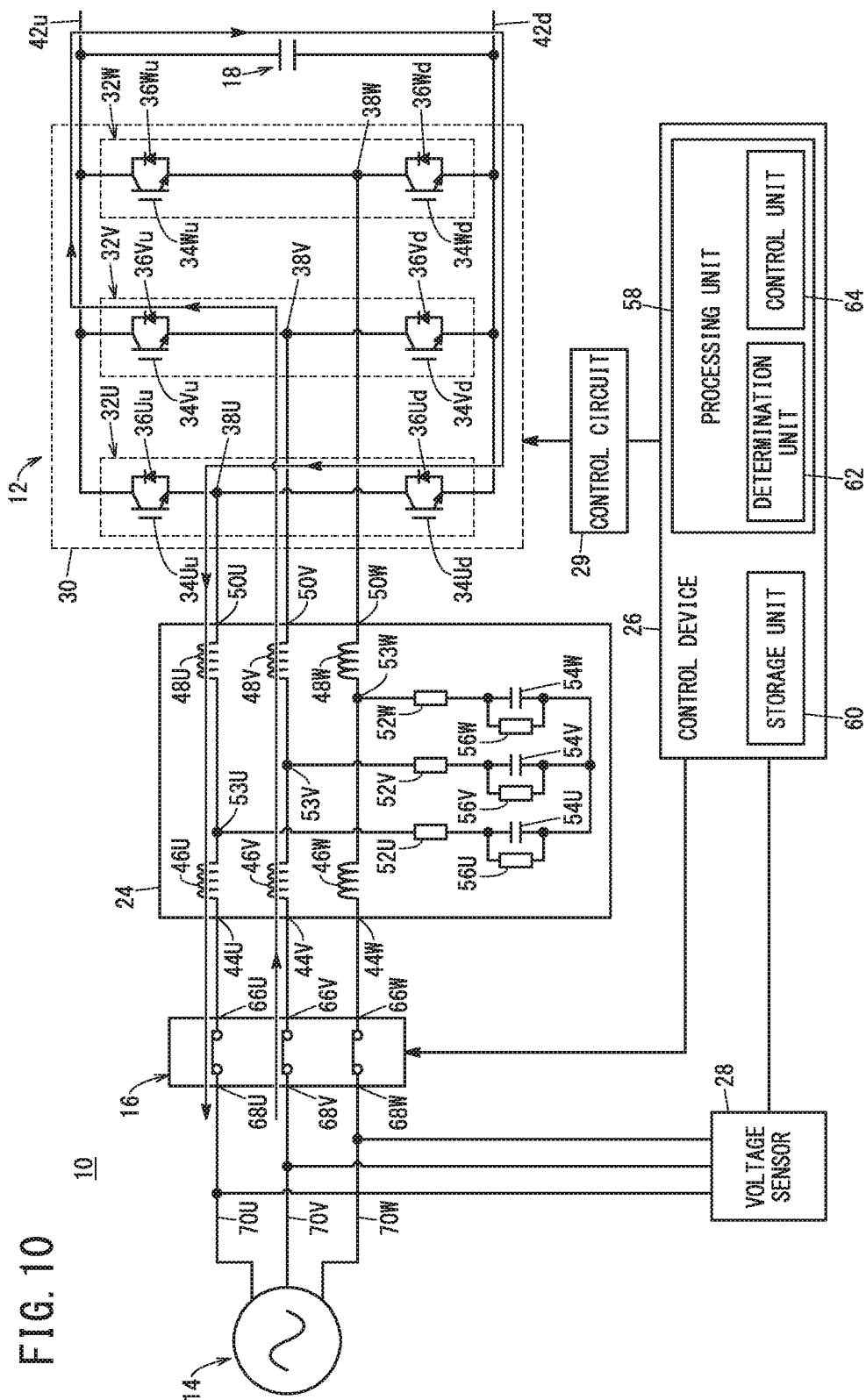
FIG. 10 is a diagram showing another example of current paths when the switch unit is closed.

FIG. 10 is a diagram showing another example of current paths when the switch unit is closed. FIG. 10 shows a case where the V phase has the highest phase voltage and the U phase has the lowest phase voltage. When the V phase has the highest phase voltage and the U phase has the lowest phase voltage, the diode 36Vu and the diode 36Ud are conductive as shown in FIG. 10. In this case, even if the switching element 34Vu connected in parallel with the diode 36Vu is set into the ON state, the switching element 34Vu will not be broken. Further, in this case, even if the switching element 34Ud connected in parallel with the diode 36Ud is set into the ON state, the switching element 34Ud will not be broken. Therefore, when the V phase has the highest phase voltage and the U phase has the lowest phase voltage, even if the switch unit 16 transitions to the closed state while the electric charge stored in the capacitor 54 is being discharged through the switching element 34Vu, the switching element 34Vu will not be broken. Additionally, when the V phase has the highest phase voltage and the U phase has the lowest phase voltage, even if the switch unit 16 transitions to the closed state while the electric charge stored in the capacitor 54 is being discharged through the switching element 34Ud, the switching element 34Ud will not be broken.

The above description was given by giving examples where the U phase has the highest phase voltage and the W phase has the lowest phase voltage and where the V phase has the highest phase voltage and the U phase has the lowest phase voltage, the combination of the phase with the highest phase voltage and the phase with the lowest phase voltage is not limited to the above. Other combinations can be considered similarly as above.

Figure 11:
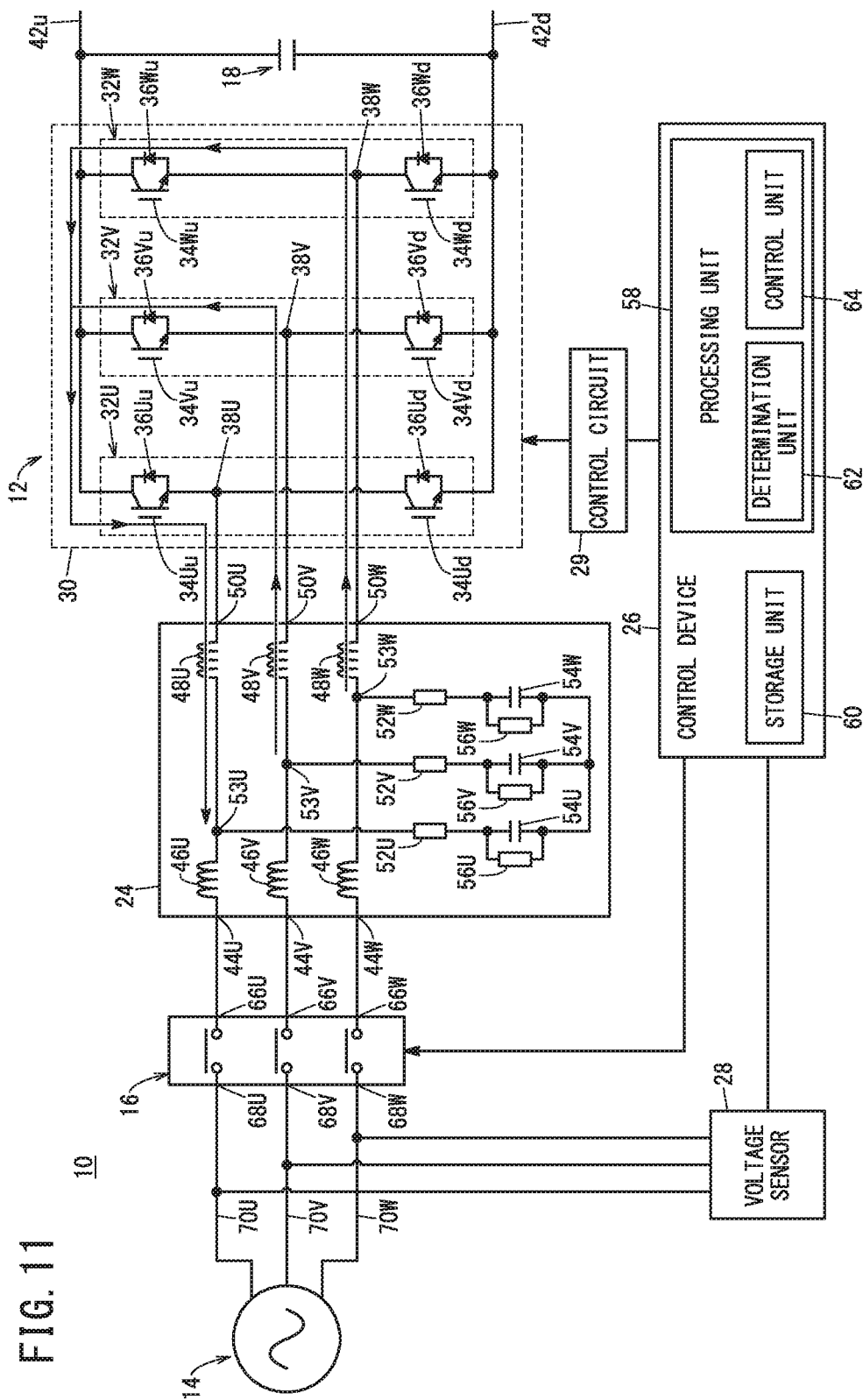
FIG. 11 is a diagram showing discharge paths when the upper arm side switching element corresponding to the U phase is set in the ON state.

FIG. 11 is a diagram showing discharge paths when the upper arm side switching element corresponding to the U phase is set in the ON state. FIG. 11 shows an example in which the switch unit 16 is in the open state and the capacitor 54U corresponding to the U phase has the lowest voltage thereacross. The voltage across the capacitor 54V corresponding to the V phase and the voltage across the capacitor 54W corresponding to the W phase are higher than the voltage across the capacitor 54U corresponding to the U phase. Therefore, as shown in FIG. 11, the electric charge stored in the capacitor 54V corresponding to the V phase flows through the diode 36Vu, and the electric charge stored in the capacitor 54W corresponding to the W phase flows through the diode 36Wu. The electric charges flowing through the diodes 36Vu and 36Wu flow through the switching element 34Uu corresponding to the U phase and then enter the capacitor 54U corresponding to the U phase. In this way, when the capacitor 54U corresponding to the U phase has the lowest voltage thereacross, the electric charge stored in the capacitor 54 is discharged when the upper arm side switching element 34Uu corresponding to the U phase is set into the ON state.

Figure 12:
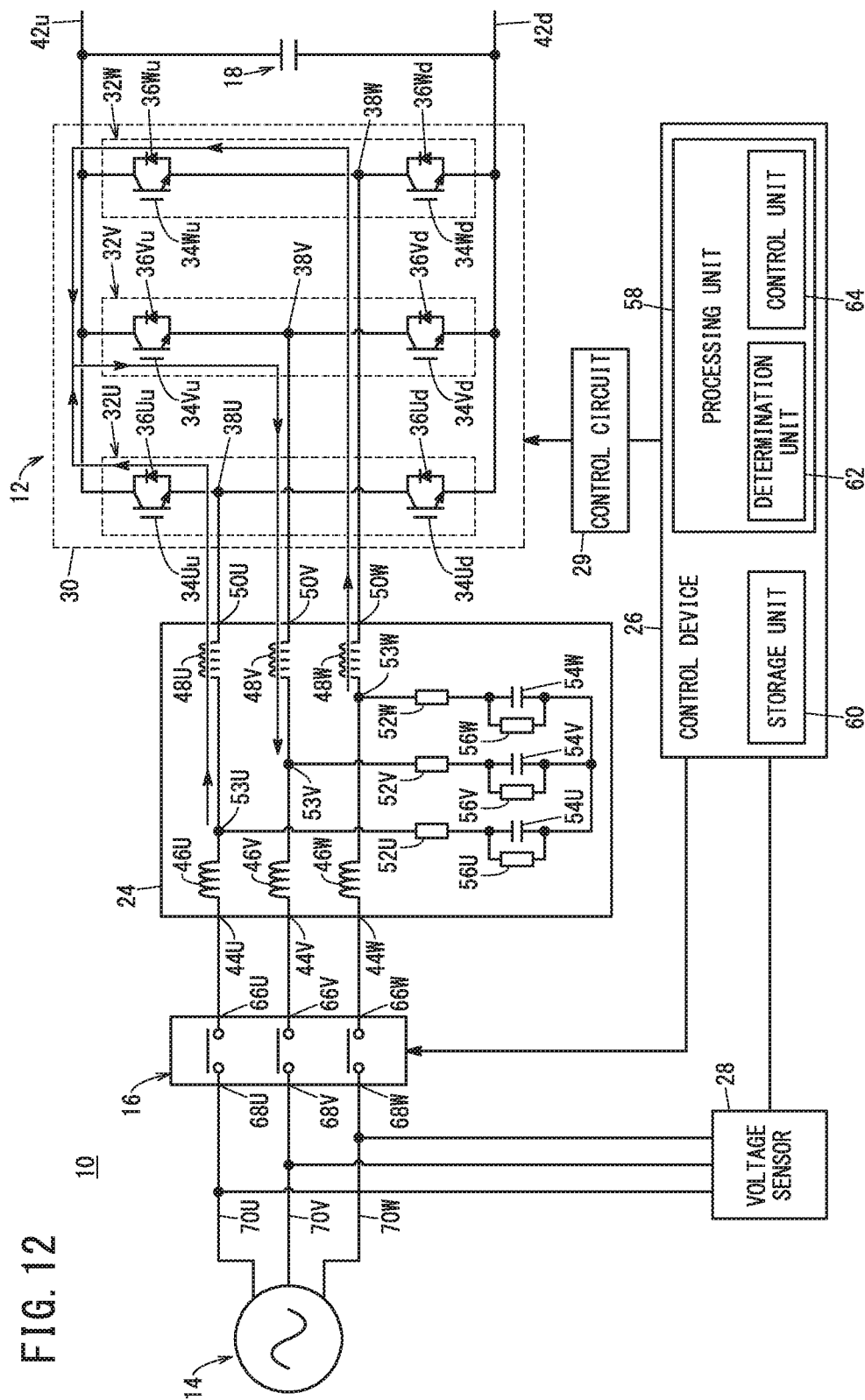
FIG. 12 is a diagram showing discharge paths when the upper arm side switching element corresponding to the V phase is set in the ON state.

FIG. 12 is a diagram showing discharge paths when the upper arm side switching element corresponding to the V phase is set in the ON state. FIG. 12 shows an example in which the switch unit 16 is in the open state and the capacitor 54V corresponding to the V phase has the lowest voltage thereacross. The voltage across the capacitor 54U corresponding to the U phase and the voltage across the capacitor 54W corresponding to the W phase are higher than the voltage across the capacitor 54V corresponding to the V phase. Therefore, as shown in FIG. 12, the electric charge stored in the capacitor 54U corresponding to the U phase flows through the diode 36Uu, and the electric charge stored in the capacitor 54W corresponding to the W phase flows through the diode 36Wu. The electric charges flowing through the diodes 36Uu and 36Wu flow through the switching element 34Vu corresponding to the V phase and then enter the capacitor 54V corresponding to the V phase. In this way, when the capacitor 54V corresponding to the V phase has the lowest voltage thereacross, the electric charge stored in the capacitor 54 is discharged when the upper arm side switching element 34Vu corresponding to the V phase is set into the ON state.

Figure 13:
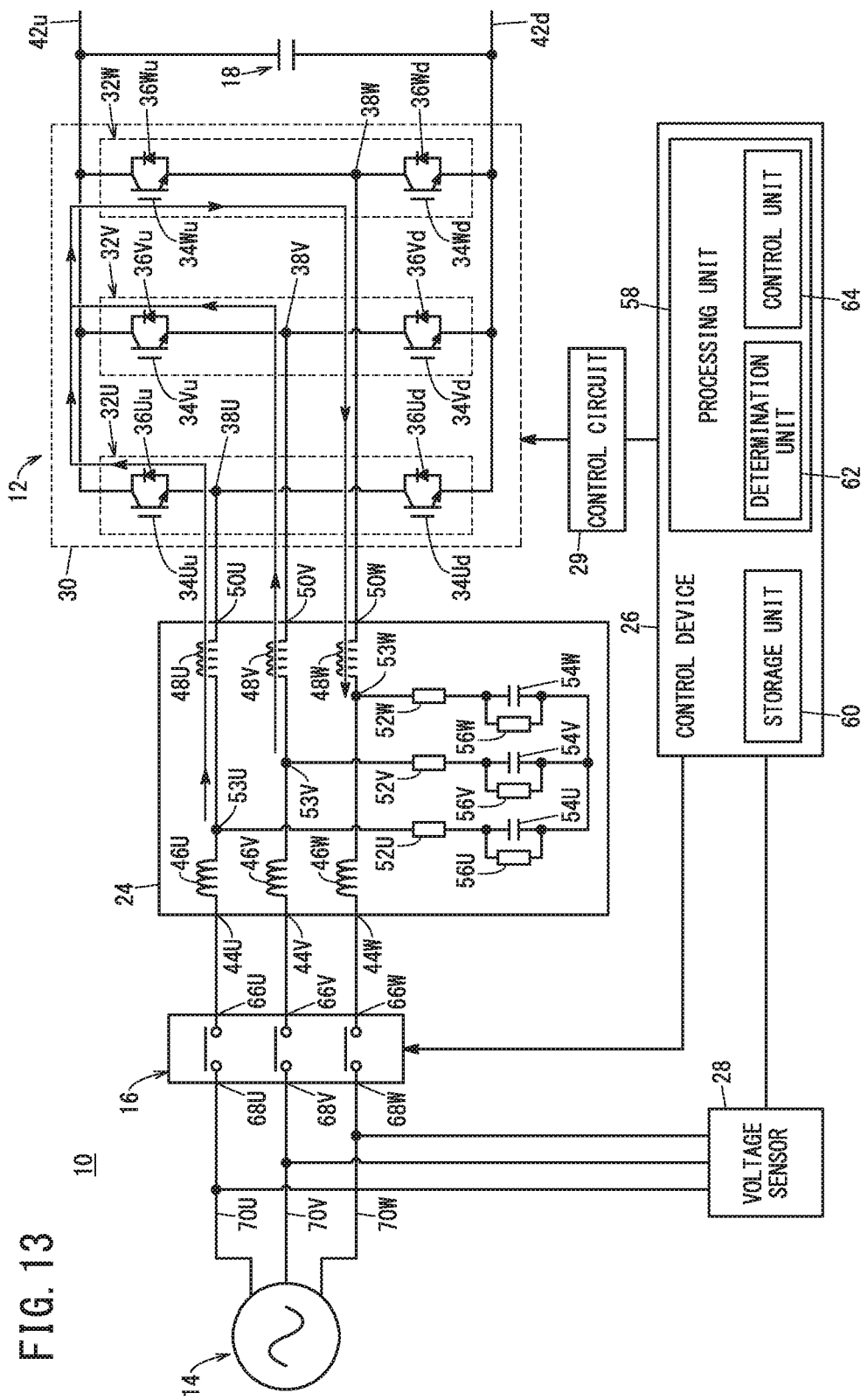
FIG. 13 is a diagram showing discharge paths when the upper arm side switching element corresponding to the W phase is set in the ON state.

FIG. 13 is a diagram showing discharge paths when the upper arm side switching element corresponding to the W phase is set in the ON state. FIG. 13 shows an example in which the switch unit 16 is in the open state and the capacitor 54W corresponding to the W phase has the lowest voltage thereacross. The voltage across the capacitor 54U corresponding to the U phase and the voltage across the capacitor 54V corresponding to the V phase are higher than the voltage across the capacitor 54W corresponding to the W phase. Therefore, as shown in FIG. 13, the electric charge stored in the capacitor 54U corresponding to the U phase flows through the diode 36Uu, and the electric charge stored in the capacitor 54V corresponding to the V phase flows through the diode 36Vu. The electric charges flowing through the diodes 36Uu and 36Vu flow through the switching element 34Wu corresponding to the W phase and then enter the capacitor 54W corresponding to the W phase. In this way, when the capacitor 54W corresponding to the W phase has the lowest voltage thereacross, the electric charge stored in the capacitor 54 is discharged when the upper arm side switching element 34Wu corresponding to the W phase is set into the ON state.

Figure 14:
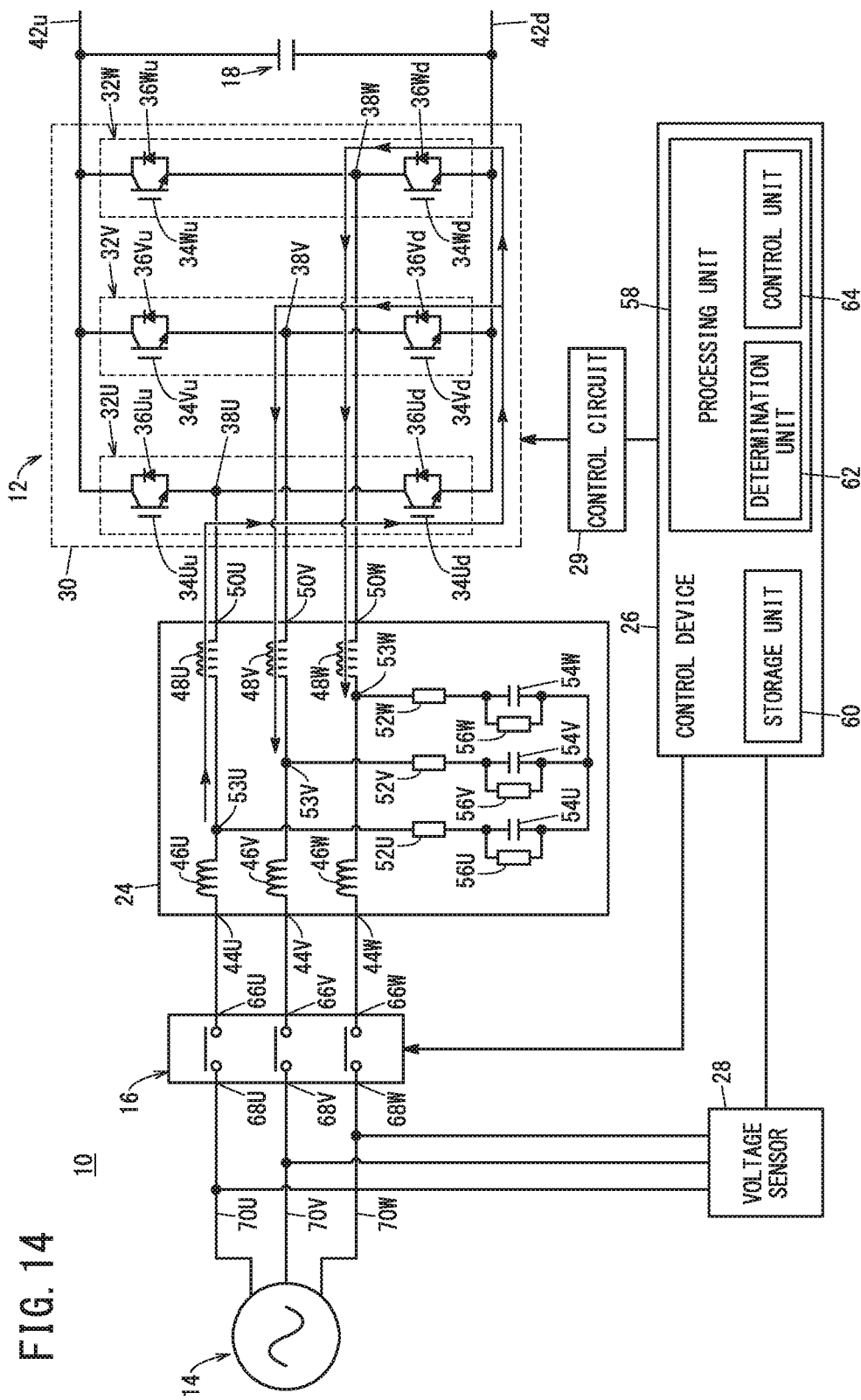
FIG. 14 is a diagram showing discharge paths when the lower arm side switching element corresponding to the U phase is set in the ON state.

FIG. 14 is a diagram showing discharge paths when the lower arm side switching element corresponding to the U phase is set in the ON state. FIG. 14 shows an example in which the switch unit 16 is in the open state and the capacitor 54U corresponding to the U phase has the highest voltage thereacross. The voltage across the capacitor 54U corresponding to the U phase is higher than the voltage across the capacitor 54V corresponding to the V phase and the voltage across the capacitor 54W corresponding to the W phase. Therefore, as shown in FIG. 14, the electric charge stored in the capacitor 54U corresponding to the U phase flows through the switching element 34Ud. The electric charge flowing through the switching element 34Ud flows through the diode 36Vd corresponding to the V phase and the diode 36Wd corresponding to the W phase. The electric charge flowing through the diode 36Vd corresponding to the V phase enters the capacitor 54V and the electric charge flowing through the diode 36Wd corresponding to the W phase enters the capacitor 54W. In this way, when the capacitor 54U corresponding to the U phase is the one having the highest voltage thereacross, the electric charge stored in the capacitor 54 is discharged when the lower arm side switching element 34Ud corresponding to the U phase is set into the ON state.

Figure 15:
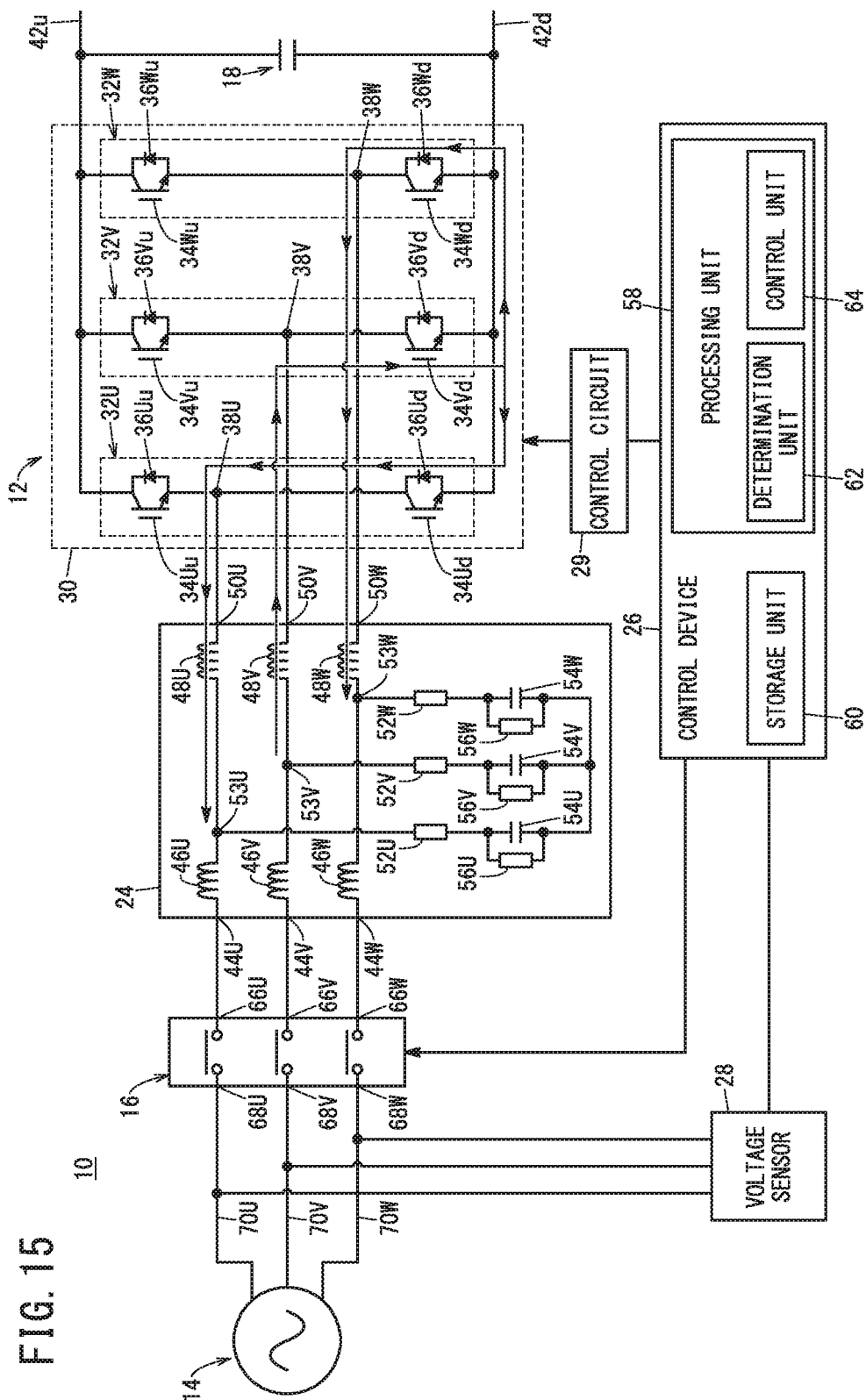
FIG. 15 is a diagram showing discharge paths when the lower arm side switching element corresponding to the V phase is set in the ON state.

FIG. 15 is a diagram showing discharge paths when the lower arm side switching element corresponding to the V phase is set in the ON state. FIG. 15 shows an example in which the switch unit 16 is in the open state and the capacitor 54V corresponding to the V phase is the one having the highest voltage thereacross. The voltage across the capacitor 54V corresponding to the V phase is higher than the voltage across the capacitor 54U corresponding to the U phase and the voltage across the capacitor 54W corresponding to the W phase. Therefore, as shown in FIG. 15, the electric charge stored in the capacitor 54V corresponding to the V phase flows through the switching element 34Vd. The electric charge flowing through the switching element 34Vd flows through the diode 36Ud corresponding to the U phase and the diode 36Wd corresponding to the W phase. The electric charge flowing through the diode 36Ud corresponding to the U phase enters the capacitor 54U, and the electric charge flowing through the diode 36Wd corresponding to the W phase enters the capacitor 54W. In this way, when the capacitor 54V corresponding to the V phase is the one having the highest voltage thereacross, the electric charge stored in the capacitor 54 is discharged when the lower arm side switching element 34Vd corresponding to the V phase is set into the ON state.

Figure 16:
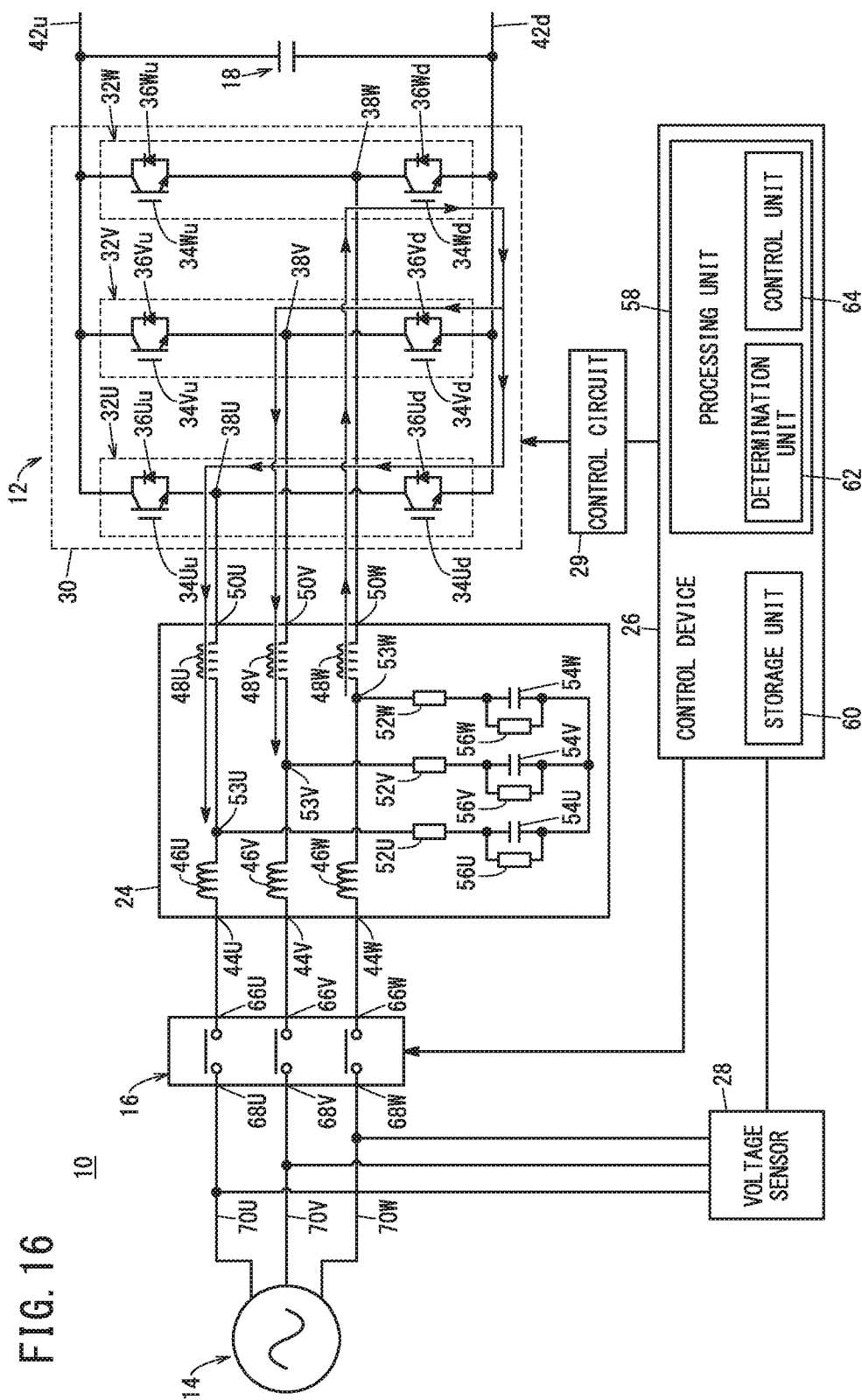
FIG. 16 is a diagram showing discharge paths when the lower arm side switching element corresponding to the W phase is set in the ON state.

FIG. 16 is a diagram showing discharge paths when the lower arm side switching element corresponding to the W phase is set in the ON state. FIG. 16 shows an example in which the switch unit 16 is in the open state and the capacitor 54W corresponding to the W phase is the one having the highest voltage thereacross. The voltage across the capacitor 54W corresponding to the W phase is higher than the voltage across the capacitor 54U corresponding to the U phase and the voltage across the capacitor 54V corresponding to the V phase. Therefore, as shown in FIG. 16, the electric charge stored in the capacitor 54W corresponding to the W phase flows through the switching element 34Wd. The electric charge flowing through the switching element 34Wd flows through the diode 36Ud corresponding to the U phase and the diode 36Vd corresponding to the V phase. The electric charge flowing through the diode 36Ud corresponding to the U phase enters the capacitor 54U, and the electric charge flowing through the diode 36Vd corresponding to the V phase enters the capacitor 54V. In this way, when the capacitor 54W corresponding to the W phase is the one having the highest voltage thereacross, the electric charge stored in the capacitor 54 is discharged when the lower arm side switching element 34Wd corresponding to the W phase is set into the ON state.

Figure 17:
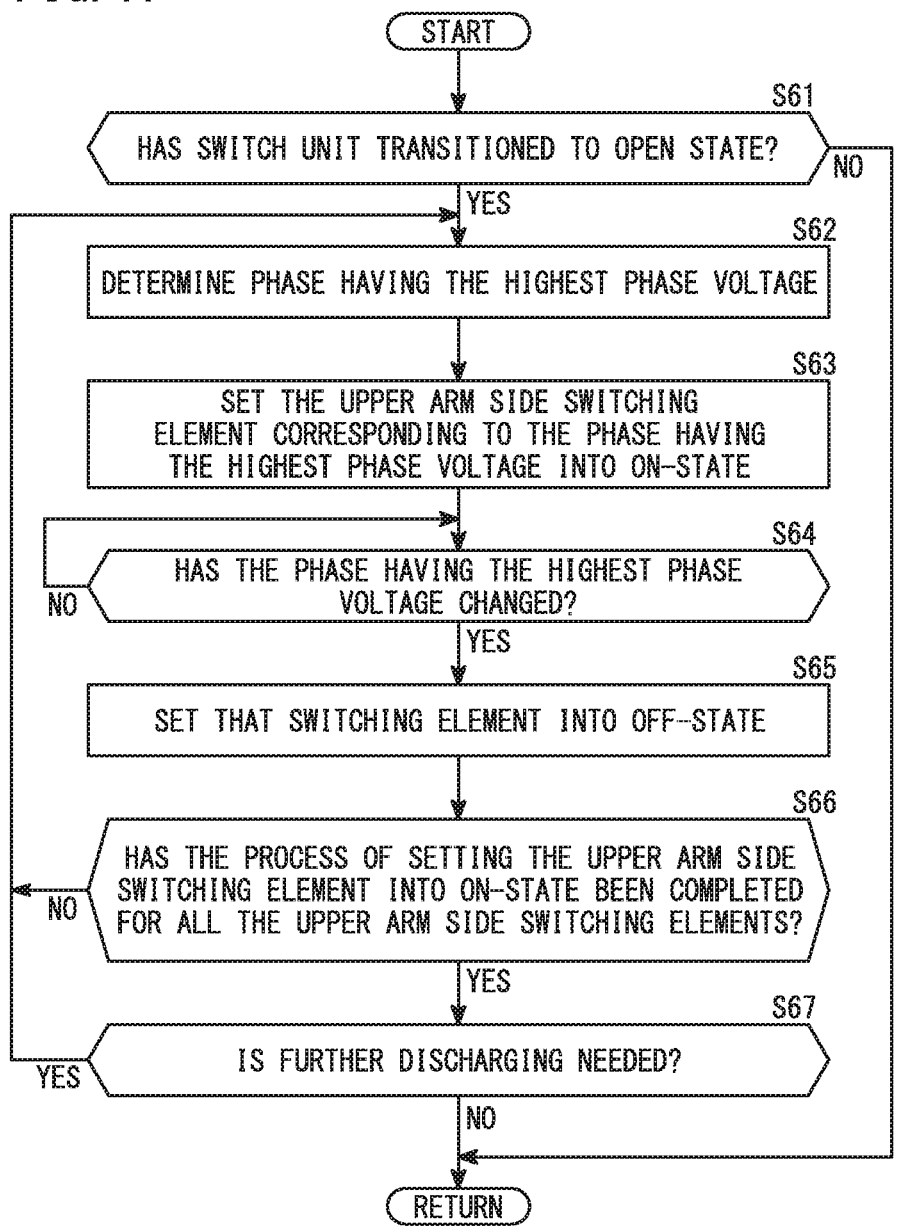
FIG. 17 is a flowchart showing an example of the operation of the power conversion apparatus according to the second embodiment.

Referring to FIG. 17, an example of the operation of the power conversion apparatus 10 according to the present embodiment will be described. FIG. 17 is a flowchart showing an example of the operation of the power conversion apparatus according to this embodiment.

At step S61, the control unit 64 determines whether or not the switch unit 16 has transitioned from the closed state to the open state. When the switch unit 16 has transitioned from the closed state to the open state (YES at step S61), the control proceeds to step S62. When the switch unit 16 has not transitioned from the closed state to the open state (NO at step S61), the control shown in FIG. 17 is ended.

At step S62, the determination unit 62 determines the phase having the highest phase voltage, based on the detection result from the voltage sensor 28. After that, the control goes to Step S63.

At step S63, the control unit 64 sets the upper arm side switching element 34u corresponding to the phase having the highest phase voltage, into the ON state. After that, the control goes to Step S64.

At step S64, the control unit 64 determines whether or not the phase having the highest phase voltage has changed from one to another. If the phase having the highest phase voltage has not changed (NO at step S64), step S64 is repeated. When the phase having the highest phase voltage has changed from one to another (YES at step S64), the control proceeds to step S65.

At step S65, the control unit 64 sets, into the OFF state, the upper arm side switching element 34u that has been in the ON state. After that, the control goes to Step S66.

At step S66, the control unit 64 determines whether or not the process of setting the upper arm side switching element 34u into the ON state has been completed for all the upper arm side switching elements 34u. When the process has not yet been completed for all the multiple upper arm side switching elements 34u (NO at step S66), the control from step S62 is repeated. When the process is completed for all the upper arm side switching elements 34u (YES at step S66), the control proceeds to step S67.

At step S67, the control unit 64 determines whether or not further discharging is needed, that is, whether or not further execution of steps S62 to S66 is needed. For example, when the time from when the switching element 34u transitions to the ON state to when it returns to the OFF state is not sufficiently long, discharging needs to be performed multiple times in order to sufficiently discharge electric charge from the capacitor 54. If further discharging is needed (YES at step S67), the control of step S62 and thereafter is executed again. If no further discharging is needed (NO at step S67), the control shown in FIG. 17 is completed.

Figure 18:
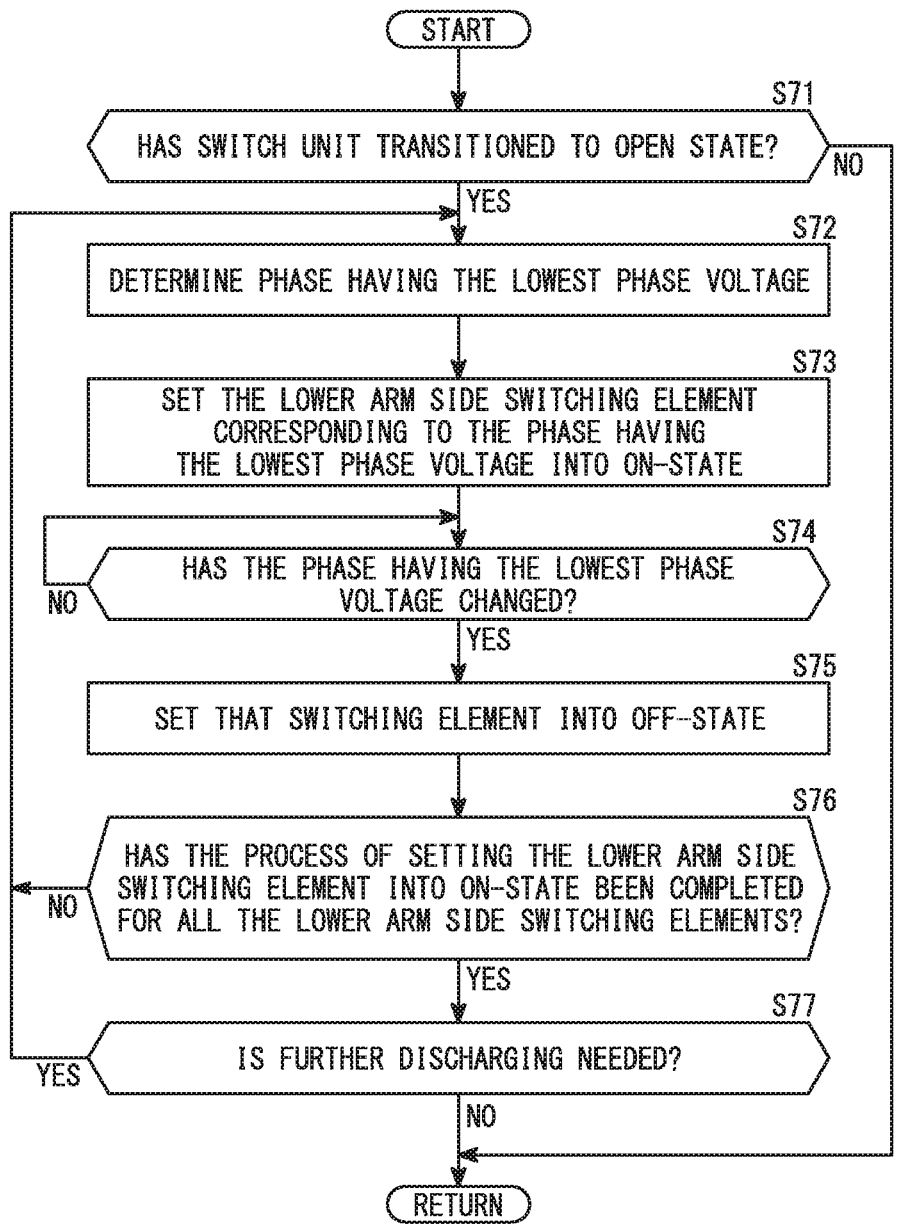
FIG. 18 is a flowchart showing another example of the operation of the power conversion apparatus according to the second embodiment.

Another example of the operation of the power conversion apparatus 10 according to this embodiment will be described with reference to FIG. 18. FIG. 18 is a flowchart showing another example of the operation of the power conversion apparatus according to this embodiment.

At step S71, the control unit 64 determines whether or not the switch unit 16 has transitioned from the closed state to the open state. When the switch unit 16 has transitioned from the closed state to the open state (YES at step S71), the control proceeds to step S72. When the switch unit 16 has not transitioned from the closed state to the open state (NO at step S71), the control shown in FIG. 18 is ended.

At step S72, the determination unit 62 determines the phase having the lowest phase voltage, based on the detection result from the voltage sensor 28. After that, the control goes to Step S73.

At step S73, the control unit 64 sets the lower arm side switching element 34d corresponding to the phase having the lowest phase voltage, into the ON state. After that, the control goes to Step S74.

At step S74, the control unit 64 determines whether or not the phase having the lowest phase voltage has changed from one to another. If the phase having the lowest phase voltage has not changed (NO at step S74), step S74 is repeated. When the phase having the lowest phase voltage has changed from one to another (YES at step S74), the control proceeds to step S75.

At step S75, the control unit 64 sets, into the OFF state, the lower arm side switching element 34d that has been in the ON state. After that, the control goes to Step S76.

At step S76, the control unit 64 determines whether or not the process of setting the lower arm side switching element 34d into the ON state has been completed for all the lower arm side switching elements 34d. When the process has not yet been completed for all the multiple lower arm side switching elements 34d (NO at step S76), the control from step S72 is repeated. When the process is completed for all the lower arm side switching elements 34d (YES at step S76), the control proceeds to step S77.

At step S77, the control unit 64 determines whether or not further discharge is needed, that is, whether or not further execution of steps S72 to S76 is needed. For example, when the time from when the switching element 34d transitions to the ON state to when it returns to the OFF state is not sufficiently long, discharging needs to be performed multiple times in order to sufficiently discharge electric charge from the capacitor 54. If further discharging is needed (YES at step S77), the control of step S72 and thereafter is executed again. If no further discharging is needed (NO at step S77), the control shown in FIG. 18 is completed.

As described heretofore, according to the present embodiment, the upper arm side switching element 34*u* corresponding to the phase having the highest phase voltage or the lower arm side switching element 34*d* corresponding to the phase having the lowest phase voltage is sequentially set into the ON state. As long as the switching element 34 in the ON state takes the above condition, even if an unintended transition from the open state to the closed state occurs in the switch unit 16, no short-circuiting of the power supply line 70 will not occur through that switching element 34. Therefore, according to the present embodiment, it is possible to provide a power conversion apparatus 10 that can favorably prevent breakage of the switching elements 34 and others.

The above embodiment is summarized as follows.

The power conversion apparatus (10) includes: a converter (12) including switching elements (34Uu, 34Vu, 34Wu, 34Ud, 34Vd, 34Wd) and configured to convert an alternate-current (AC) voltage supplied from an AC power supply (14) through a switch unit (16), into a direct-current (DC) voltage; a filter (24) provided between the switch unit and the converter and including reactors (46U, 46V, 46W, 48U, 48V, 48W) and capacitors (54U, 54V, 54W), the filter being configured to remove noise; and a control unit (64) configured to discharge electric charge stored in the capacitors by setting the switching elements into the ON state after opening the switch unit. This configuration makes it possible to smoothly discharge the electric charge stored in the capacitors through the switching elements after opening the switch unit. Therefore, according to this configuration, it is possible to prevent the peak of resonance voltage from becoming significantly large, and hence favorably prevent breakage of the switching elements 34 and others.

The above power conversion apparatus may be configured such that the AC power supply is a multi-phase AC power supply configured to supply a multiphase voltage; the converter includes a plurality of power device units (32U, 32V, 32W), corresponding to respective phases of the AC power supply, and each of the power device units having the switching element on the upper arm side (the upper arm side switching element) and the switching element on the lower arm side (the lower arm side switching element) that are connected in series to each other; the filter includes the reactor and the capacitor corresponding to each phase of the AC power supply; and the control unit sets all of the switching elements on the upper arm side or the lower arm side of the multiple power device units into the ON state to thereby discharge the electric charge stored in the capacitors corresponding to respective phases of the AC power supply. According to this configuration, no matter which capacitor is the one having a large voltage thereacross, it is possible to discharge the electric charge stored in the capacitor through the associated switching element.

The control unit may be configured to simultaneously set the switching elements on the upper arm side or the lower arm side in the multiple power device units into the ON state. This configuration makes it possible to reduce the time required for discharging compared to the case where the switching elements are set into the ON state, by turns.

The control unit may be configured to set into the ON state one of the switching elements on the upper arm side or the lower arm side in the multiple power device units, and switch the switching elements in the ON state, in turn.

The power conversion apparatus may further include a detection unit (28) configured to detect the phase voltage in each phase of the AC power supply, and the control unit may be configured to set into the ON state the upper arm side switching element corresponding to the phase with the highest phase voltage, based on the detection result from the detection unit. According to this configuration, even if an unintended transition from the open state to the closed state occurs in the switch unit, it is possible to prevent occurrence of short-circuiting of the power supply line through switching elements, and hence prevent breakage of the switching elements and others.

The power conversion apparatus may further include a detection unit configured to detect the phase voltage in each phase of the AC power supply, wherein the control unit is configured to set into the ON state the lower arm side switching element corresponding to the phase with the lowest phase voltage, based on the detection result from the detection unit. According to this configuration, even if an unintended transition from the open state to the closed state occurs in the switch unit, it is possible to prevent occurrence of short-circuiting of the power supply line through the switching elements, and hence prevent breakage of the switching elements and others.

The above power conversion apparatus may be configured such that the multiple power device units are connected in parallel with each other, and the node (38U, 38V, 38W) at which the switching element on the upper arm side and the switching element on the lower arm side in each power device unit are connected is supplied with the phase voltage corresponding to the corresponding phase.

A control method of a power conversion apparatus including: a converter including switching elements and configured to convert an AC voltage supplied from an AC power supply through a switch unit into a DC voltage; a filter provided between the switch unit and the converter and including reactors and capacitors, the filter being configured to remove noise; and a control unit configured to control the switch unit and the switching elements, includes: a step (S1) of opening the switch unit; and a step (S2) of discharging electric charge stored in the capacitors by setting the switching elements into the ON state.

The present invention is not particularly limited to the embodiment described above, and various modifications are possible without departing from the essence and gist of the present invention.

What is claimed is:

1. A power conversion apparatus, comprising:
   a converter including switching elements and configured to convert an alternate-current voltage supplied from an alternate-current power supply through a switch unit, into a direct-current voltage;
   a filter provided between the switch unit and the converter and including reactors and capacitors, the filter being configured to remove noise; and
   a control unit configured to discharge electric charge stored in the capacitors by setting the switching elements into an ON state after opening the switch unit,
   wherein:
   the alternate-current power supply is a multi-phase alternate-current power supply configured to supply a multiphase voltage;
   the converter includes a plurality of power device units, corresponding to respective phases of the alternate-current power supply, each of the power device units having the switching element on an upper arm side and the switching element on a lower arm side that are connected in series to each other;

the filter includes the reactor and the capacitor corresponding to each phase of the alternate-current power supply;

the alternate-current power supply includes a first phase, a second phase, and a third phase;

the switch unit includes a first switch path corresponding to the first phase, a second switch path corresponding to the second phase, and a third switch path corresponding to the third phase;

a first power device unit of the plurality of power device units is connected to the first switch path;

a second power device unit of the plurality of power device units is connected to the second switch path;

a third power device unit of the plurality of power device units is connected to the third switch path; and the capacitors include a first capacitor corresponding to the first phase, a second capacitor corresponding to the second phase, and a third capacitor corresponding to the third phase;

in a case where the switching element on the upper arm side provided for the first power device unit is set into the ON state with a voltage of the first capacitor being lower than a voltage of the second capacitor and being also lower than a voltage of the third capacitor, a diode connected in parallel to the switching element on the upper arm side provided for the second power device unit is conductive and a diode connected in parallel to the switching element on the upper arm side provided for the third power device unit is conductive, enabling the capacitors to discharge.

2. The power conversion apparatus according to claim 1, wherein:

the control unit sets all of the switching elements on the upper arm side or the lower arm side of the plurality of power device units into the ON state to thereby discharge the electric charge stored in the capacitors corresponding to respective phases of the alternate-current power supply.

3. The power conversion apparatus according to claim 2, wherein the control unit is configured to simultaneously set the switching elements on the upper arm side or the lower arm side in the plurality of power device units into the ON state.

4. The power conversion apparatus according to claim 2, wherein the control unit is configured to set, into the ON state, one of the switching elements on the upper arm side or the lower arm side in the plurality of power device units, and switch the switching elements in the ON state, in turn.

5. The power conversion apparatus according to claim 4, further comprising a detection unit configured to detect a phase voltage in the each phase of the alternate-current power supply, wherein the control unit is configured to set, into the ON state, the switching element on the upper arm side corresponding to one of the phases that has a highest phase voltage, based on a detection result from the detection unit.

6. The power conversion apparatus according to claim 4, further comprising a detection unit configured to detect a phase voltage in the each phase of the alternate-current power supply, wherein the control unit is configured to set, into the ON state, the switching element on the lower arm side corresponding to one of the phases that has a lowest phase voltage, based on a detection result from the detection unit.

7. The power conversion apparatus according to claim 2, wherein:

the plurality of power device units are connected in parallel with each other; and a node at which the switching element on the upper arm side and the switching element on the lower arm side in each power device unit are connected is supplied with a phase voltage corresponding to the corresponding respective phase.

8. A control method of a power conversion apparatus, the power conversion apparatus comprising a converter including switching elements and configured to convert an alternate-current voltage supplied from an alternate-current power supply through a switch unit into a direct-current voltage, the alternate-current power supply includes a first phase, a second phase, and a third phase; wherein the alternate-current power supply is a multi-phase alternate-current power supply configured to supply a multiphase voltage; the converter includes a plurality of power device units, corresponding to respective phases of the alternate-current power supply, each of the power device units having the switching element on an upper arm side and the switching element on a lower arm side that are connected in series to each other; a filter provided between the switch unit and the converter and including reactors and capacitors, the filter being configured to remove noise; the filter includes a respective reactor and a respective capacitor corresponding to each phase of the alternate-current power supply; and a control unit configured to control the switch unit and the switching elements, wherein the capacitors include a first capacitor corresponding to the first phase, a second capacitor corresponding to the second phase, and a third capacitor corresponding to the third phase;

the control method comprising:

opening the switch unit; and discharging electric charge stored in the capacitors by setting the switching elements into an ON state, including operatively coupling a first power device unit of the plurality of power device units to a first switch path, wherein the switch unit includes the first switch path corresponding to the first phase, a second switch path corresponding to the second phase, and a third switch path corresponding to the third phase;

operatively coupling a second power device unit of the plurality of power device units to the second switch path;

operatively coupling a third power device unit of the plurality of power device units to the third switch path;

setting the switching element on the upper arm side provided for the first power device unit into the ON state with a voltage of the first capacitor being lower than a voltage of the second capacitor and being also lower than a voltage of the third capacitor;

configuring a diode connected in parallel to the switching element on the upper arm side provided for the second power device unit to be conductive;

configuring a diode connected in parallel to the switching element on the upper arm side provided for the third power device unit to be conductive; and enabling the capacitors to discharge.

* * * * *